(12) United States Patent
Hamamoto et al.

(10) Patent No.: US 6,649,121 B1
(45) Date of Patent: Nov. 18, 2003

(54) METHOD OF PRODUCING LAMINATED BOTTLES HAVING PEELABLE INNER LAYER

(75) Inventors: Keiji Hamamoto, Toyono-gun (JP); Hirokazu Mihashi, Kameoka (JP)

(73) Assignee: Taisei Kako Co., Ltd., Osaka (JP)

(*) Notice: Subject to any disclaimer, the term of this patent is extended or adjusted under 35 U.S.C. 154(b) by 171 days.

(21) Appl. No.: 09/856,582

(22) PCT Filed: Oct. 2, 2000

(86) PCT No.: PCT/JP00/06862

§ 371 (c)(1), (2), (4) Date: May 23, 2001

(87) PCT Pub. No.: WO01/26881

PCT Pub. Date: Apr. 19, 2001

(30) Foreign Application Priority Data

Oct. 8, 1999 (JP) ............................................. 11-288788
Oct. 8, 1999 (JP) ............................................. 11-288789

(51) Int. Cl.$^7$ ........................ B29C 49/06; B29C 49/22
(52) U.S. Cl. ...................... 264/513; 264/537; 264/255; 264/267; 425/533
(58) Field of Search .................. 264/513, 523, 264/537, 532, 255, 328.8, 267, 268; 425/522, 529, 533, 523

(56) References Cited

U.S. PATENT DOCUMENTS

| | | | |
|---|---|---|---|
| 5,301,838 A | | 4/1994 | Schmidt et al. |
| 5,407,629 A | * | 4/1995 | Schmidt et al. ............. 264/512 |
| 5,433,347 A | * | 7/1995 | Richter et al. .............. 222/105 |
| 5,651,998 A | * | 7/1997 | Bertschi et al. ............. 425/127 |
| 5,688,570 A | * | 11/1997 | Ruttinger, Sr. ............. 428/35.7 |
| 6,238,201 B1 | * | 5/2001 | Safian ........................ 425/527 |
| 6,312,641 B1 | * | 11/2001 | Hutchinson ................ 264/513 |

FOREIGN PATENT DOCUMENTS

| | | |
|---|---|---|
| JP | 04267727 | 9/1992 |
| JP | 5213373 | 8/1993 |
| JP | 6505463 | 6/1994 |
| JP | 06238708 | 8/1994 |
| JP | 6238708 | 8/1994 |
| JP | 08001761 | 1/1996 |
| JP | 09208688 | 8/1997 |
| JP | 10128833 | 5/1998 |
| JP | 10180853 | 7/1998 |
| JP | 200043126 | 2/2000 |
| WO | 5213373 | 8/1993 |

* cited by examiner

*Primary Examiner*—Jill L. Heitbrink
*Assistant Examiner*—Monica A Fontaine
(74) *Attorney, Agent, or Firm*—Wood, Phillips, Katz, Clark & Mortimer

(57) ABSTRACT

The present invention provides a method of making laminated bottles each having an outer layer and an inner layer capable of delaminating from the former layer. The method consists of the step of injection molding an outer preform from a molten first resin, and the next step of injection molding an inner preform inside the outer preform, using a molten second resin. The method further has the final step of blow molding a parison composed of the outer and inner preforms so as to form each laminated bottle. The second resin has a melting point lower than that of the first resin, nevertheless and contrarily to the prior art, precise parisons affording satisfactory lamination can now be prepared by the injection molding steps. In addition, ventilation holes are formed in the outer layer readily and surely without damaging the inner layer.

8 Claims, 21 Drawing Sheets

METHOD OF PRODUCING LAMINATED BOTTLES HAVING PEELABLE INNER LAYER

FIELD OF THE INVENTION

The present invention relates to a method of making laminated containers whose peripheral walls are composed each of an outer layer and an inner layer disposed therein to be delaminated therefrom. The invention relates also to a method of forming at least one hole solely in the outer layer constituting an injection-laminated parison or the like used to blow mold a delaminatable container.

BACKGROUND OF THE INVENTION

Japanese Patent Laying-Open Gazette No. Hei. 4-267727 discloses a laminated container having a delaminatable layer designed such that ambient air is inhibited from entering the container through a mouth while allowing its content to be discharged. This container is composed of an impermeable inner layer and a squeezable outer layer, wherein the inner layer can be readily delaminated from the outer layer in which at least one ventilation hole is formed such that the ambient air can communicate with the space between the layers. In this way, the inner layer will spontaneously shrink as quantity of the content decreases, with the ambient air flowing into the space through said hole so that only the outer layer can restore its normal configuration. Its content remains satisfactory in quality, from the beginning to end of use, without being impaired by air or light beams.

The direct blow molding known in the art may be an example of the method of manufacturing laminated bottles of this kind. In this method, a multi-layer extruder is used to extrude an inner resin layer and an outer resin layer laminated thereon to form a cylindrical parison. This parison will be placed in a blow forming mold (and pinched off to provide a closed bottom in a finished bottle), axially stretched and simultaneously blow molded, to thereby give the finished bottle having the delaminatable inner layer.

In the described prior art laminated bottles, their inner layers should have each a highly precise wall thickness. In particular, evenness in wall thickness is more strictly required for profiled or 'modified cross section' bottles such as elliptic bottles. In order to meet such a requirement, the so-called 'injection blow-molding' method is preferable wherein a laminated parison that has been prepared by injection molding will be blow molded.

In many cases, the described laminated bottles are used as containers for holding therein certain liquids (such as hair-dye) that are likely to change in their properties due to contact with air. Selection of a resin material for forming the inner layer must be done carefully lest the content should undergo any noticeable deterioration even if stored for a long time. Further, the material is to be selected from relatively soft ones because the inner layers have to gradually shrink during use. Examples of materials satisfying these conditions may be polyolefin resins such as a polypropylene and a polyethylene. Polyolefin resins are highly resistant to chemicals and almost impermeable for gases. Certain medically active ingredients prone to deteriorate due to expiration of water vapor are protected from deterioration. A 'PET' or the like resin may be preferred as a material for forming the outer layer.

Polyolefin such as polyethylene have lower melting points than saturated polyesters such as PET. If the injection-stretching method accompanied by the subsequent blow-molding step is applied to preparation of a laminated parison wherein an inner preform is injected prior to injection of an outer preform, then the following problem would occur. Since the thermal deformation temperature of the already prepared inner preform is lower than the molding temperature for the outer preform, the inner preform will probably melt when molding the outer preform, failing to manufacture useful multi-layer preforms.

Since the inner layer of said laminated container will gradually shrink as its content is consumed, it is desirable that the outer and inner layers firmly engage with each other at bottom in order to smoothen the shrinkage of inner layer. It is described in the above Gazette that the outer and inner layers are fixed on each other at their bottoms, but not teaching how to do this. On the other hand, Japanese Utility Model Publication No. Hei. 7-48519 shows a pinched-off ridge that is formed in the container bottom so as to unite the outer layer with the inner layer. In detail, when blow molding the container, a raw multi-layer preform that has been extruded from a molding apparatus through a nozzle thereof will be pinched off in such a manner that mutually-engaging corrugations are formed by pressing bottom portions of the layers sideways. This structure will provide the outer and inner layers firmly bonded to each other, though an extra additional device is necessary to press the bottom portion, failing to match the injection-stretching-blow-molding method.

A first object of the present invention is therefore to provide a method of making a laminated bottle by injection molding a laminated parison that will subsequently be blow molded smoothly to form the bottle of an improved quality, wherein optimum materials are chosen for an inner layer and an outer layer, respectively. Another object is to facilitate the inner layer to be easily combined in part with the outer layer.

A user may close with his or her finger(s) a ventilation hole(s) that is(are) formed in the prior art delaminatable container for introducing ambient air in between its layers. Alternatively, a film tag may be adhered in part to the rim of the ventilation hole so that the tag larger than the hole is disposed inside the outer layer. Such a kind of valve will allow the air to flow inwards through the outer layer, but not through the inner layer. With the container being gripped by the user, the ventilation hole will be closed with his or her fingers or by the valve so as not to allow any amount of air to leak out from the interlayer space. Such a depressed outer layer will cause the interlayer air to press in a centripetal direction the inner layer to exude the content out of the container.

In the prior art of this type, whether accompanied by the valve or not, the outer layer having the ventilation hole(s) has generally been blow molded or hot molded before integrating the inner and outer layers one another. Alternatively, a protrusion jutting from the inner wall defining a blow-molding cavity has served to directly form a ventilation hole or to form a groove readily transformable into a hole.

The prior art method consisting of the steps of preliminarily blow molding the outer layer and subsequently integrating it with the inner layer does however require so many steps as raising manufacture cost of the delaminatable containers and lowering yield thereof. The lug protruding inwardly from the inner wall defining the blow-molding cavity is described as a means useful to form the ventilation hole solely in the outer layer. However, there is a possibility that such a lug would injure the inner layer. The forming of such a preliminary groove in the outer layer may be possible, but semi-finished containers have to be after-treated one by one with hand to transform them into the holes. Operation efficiency in manufacture of those containers will thus be lowered, raising manufacture cost. Also disadvantageously, the late opening of the hole in the outer layer is likely to damage the inner layer.

A second object of the present invention is to provide a method of making a laminated bottle in such a manner that at least one ventilation hole can be formed easily and surely in an outer layer, without any fear of injuring an inner layer, and more particularly to provide a method of forming at least one hole only in the outer layer of an injection molded laminated article such as a parison for use to blow mold a laminated container having the delaminatable inner layer.

DISCLOSURE OF THE INVENTION

The present invention provides a method of making a laminated bottle having a outer layer and a inner layer laminated on an inner surface of the outer layer so as to be capable of delaminating from the surface. The present method may comprise the steps of injection molding a preform for the outer layer by injecting a molten first resin, then injection molding inside the preform a further preform for the inner layer by injecting a molten second resin so that the preforms comprise a parison, and finally blow molding the laminated bottle by blowing the parison. In this method, the second resin may have a melting point lower than that of the first resin.

In the method of the present invention, a injection mold may be used for said injection molding of the inner preform, the mold comprising a core segment and a cavity segment, the core segment having an injection gate formed therein. Furthermore, injection molding the inner preform may comprise the steps of loading the outer preform in the cavity segment, subsequently clamping the core segment and the cavity segment, and finally injecting the second resin inside the outer preform through the gate in the core segment.

Also in the method of the present invention, the method may further comprise the step of forming a through-hole in the outer preform being injection molded. The through-hole may preferably be formed at a portion thereof facing an injection gate for injecting the second resin.

It may be possible that injection molding the inner preform comprises injecting the second resin through the gate and also the through-hole to flow along an inner surface of the outer preform.

Further in the method of the present invention, the through-hole may be formed by a first pin, the pin projecting toward a further injection gate for injecting the first resin through it after injecting of the first resin has been finished so that an end portion of the pin strikes the further gate.

Further in the method of the present invention, a flange may be formed of the second resin when injection molding the inner preform, such that the flange formed integral with the inner preform is located outside the through-hole formed in the outer layer.

In the method of the present invention, the inner preform may be injection molded so as to a bulge of the second resin is formed, the bulge projecting through the through-hole from the outer preform. Furthermore, a stretching rod used for longitudinal stretching the parison may depress and collapse the bulge at said blow molding.

In the method of the present invention, the inner preform may be injection molded to be integral with a plurality of thickened portions extending vertically at angular intervals.

Also in the method of the present invention, the inner preform may be injection molded to have a body that is formed integral with at least one thickened portions extending in a helical direction.

The present invention is applicable to make the laminated bottle having at least one ventilation hole to allow ambient air to flow in between the outer and inner layers. In this case, such ventilation hole may be formed at the step of injection molding the outer preform, and when the inner preform is subsequently injection molded, a second pin may have been inserted from outside and through the outer preform in such a manner that an end portion of the second pin is held substantially in flush with the inner surface of the outer preform.

In the method of the present invention for manufacture of the laminated bottle having the ventilation hole, a cavity segment and a first core segment for molding the outer preform may be used for injection molding the outer preform. Preferably, this method further comprising the additional step of replacing the first core segment with a second core segment for molding the inner preform, without removing the outer preform out of the cavity segment, with the additional step being interposed between the steps of injection molding the outer and inner preforms. The cavity segment and the second segment may be used for injection molding the inner preform. Furthermore, forming the ventilation hole may comprise striking the second pin against the first core segment before the resin of the outer preform cures at the step of injection molding the outer preform. The ventilation hole preferable remain closed with the second pin during injection molding the inner layer.

Additionally, the second pin may be capable of shifting between its projected position where the pin strikes the first core segment clamped to the cavity segment and its retracted position where the pin is embedded in the cavity segment.

Also in the method of the present invention, the outer preform may be held by a lip mold all through the first, second and third steps. In this case, the second pin may be capable of shifting between its projected position where the pin strikes the first core segment clamped to the cavity segment and its retracted position where the pin is embedded in the lip mold. The pin at the projected position will clog the ventilation hole but the pin at the retracted position leaves the hole opened.

Further in the method of the present invention, a first injection mold may be used for injection molding the outer preform and a second injection mold is used for injection molding the inner preform. Further, this method preferable comprises the steps, between the steps of respectively injection molding the outer and inner preforms, of releasing the outer preform from the first mold, loading the released outer preform into the second mold, inserting the pin into the ventilation hole that has been formed in the outer preform. The pin may remain left is the ventilation hole during injection molding the inner layer.

In the method of the present invention, the parison may be blow molded such that the stretching for orientation of the preforms is conducted for the portion thereof located below the ventilation hole.

Also this invention proposes a method of making at least one hole solely in an outer layer of an injection molded laminated product having an inner layer formed on an inner surface of the outer layer, the method comprising:

the step of injection molding the outer layer, and the step of subsequently injection molding the inner layer using a resin whose melting point is lower than that of a further resin forming the outer layer, wherein the at least one hole is formed during the step injection molding the outer layer, and the inner layer is injection molded such that an inner end of at least one pin inserted from outside is temporarily located substantially in flush with the inner surface of the outer layer.

DETAILED DESCRIPTION OF THE INVENTION

Figure 1:
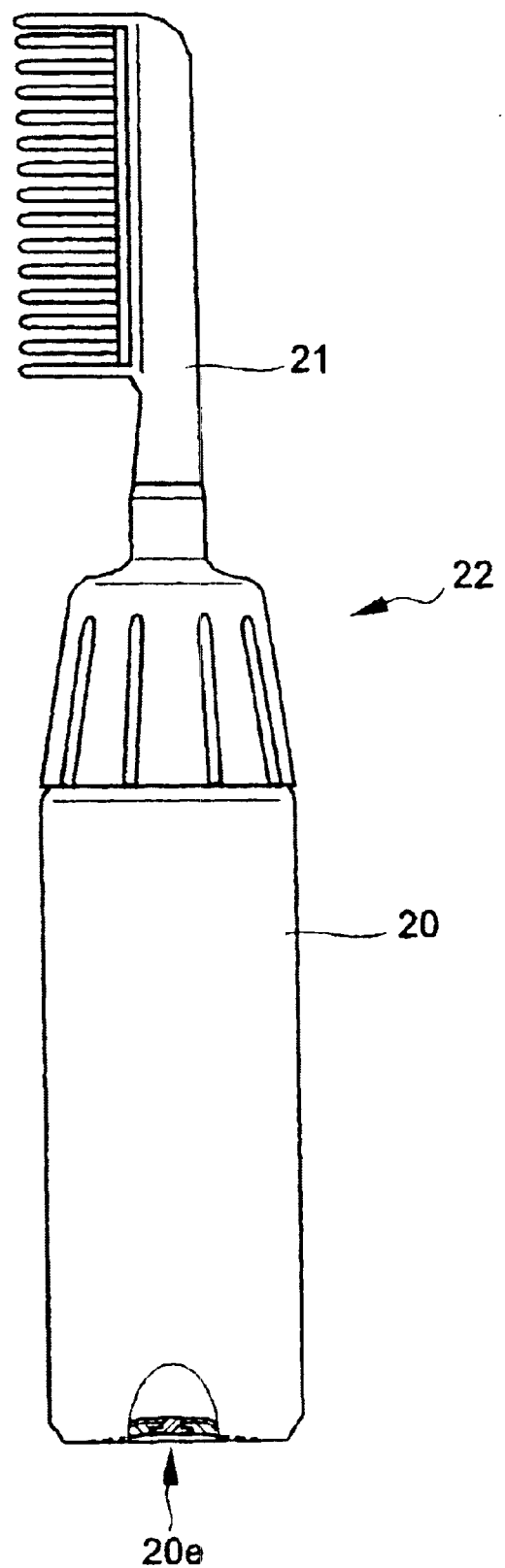
FIG. 1 is a side elevation of a comb shaped product comprising as a part thereof a laminated bottle that may be manufactured by a method which the present invention provides in an embodiment thereof.

The present invention provides a method of making laminated bottles whose peripheral walls are composed each of an outer layer and an inner layer disposed therein, a resin of which has a lower melting point than that of the outer layer. The method is characterized in that an inner preform is molded inside the outer layer by injection molding the resin of the melting point lower than that of the outer preform that has been injection molded, so as to prepare a parison composed of the injection molded preforms. According the invention, this parison will then be subjected, as usual, to the blow-molding step to provide a finished laminated bottle. In this invention, the inner preform is molded after the outer preform has been molded. Therefore, even if the inner preform is made of a polyolefin or the like and the outer preform is made of a 'PET', 'EVOH' or the like, these two kinds of resins will not intermix with each other but be demarcated from each other. Consequently, the delaminatable laminated bottle made by this method has the inner layer that is readily exfoliated from the outer layer in use, with a liquid content in this bottle being protected well from change in its properties. Both the outer and inner layers of each bottle provided herein may respectively have bodies and mouths. The body of the outer layer may be squeezable, or alternatively be rigid in case of mounting a pump in a mouth of the bottle.

In the method of the present invention, the injection molding of the inner layer may be conducted using an injection mold that consists of a core segment having an injection gate and a cavity segment. Further, the inner preform may be injection molded in such a manner that the outer preform is inserted at first in the cavity segment of the mold, the core and this cavity segments are then fastened to each other. Finally, the second resin is injected through the injection gate onto an inner surface of the outer preform, in a case wherein the gate is formed in and through the core segment. This mode will not make any gate flashes exposed to the outside, but rather give products an improved appearance. Preferably, the gate may be formed in and through pointed central region of the core segment.

A through-hole may be formed in the outer preform when this preform is injection molded, so that a gate penetrating the cavity segment for injection of the second resin does face the through-hole. In this case, a molten resin will be guided through this gate and the through-hole into the interior of the outer layer that has been placed in the mold for injection molding the inner layer.

Further, the through-hole in the outer preform may be produced by putting a pin towards the gate so as to bring a free end of the pin into contact with the gate, after injection of the resin though the gate. The gate in this case will be sealed up with the pin lest any gate flashes should be produced, thus making it unnecessary to remove them.

A flange may be produced of the same resin as the inner preform so as to be disposed outside the through-hole during the injection molding of the inner preform. The flange is integral with this portion disposed in the through-hole and integral with the inner preform. Such a flange is considerably larger than the through-hole in diameter so that the inner layer can be secured to and fixed in the outer layer. Due to this feature, a stretching rod used at the step of stretching and blow molding will be prevented from peeling the inner layer off the outer layer. If such a flange is located at the bottom of the bottle, the inner layer will be delaminated from the outer layer during use, avoiding any curling up of the inner layer's lower end portion. The 'flange' may be formed in flush with the outer surface of the outer layer, or jutting outwards from the through-hole.

The method of the present invention is adapted for application to manufacture of laminated bottles each having a delaminatable inner layer. For this purpose, the method may comprise the steps of injection molding the outer preform and subsequently the inner preform so as to allow the blow molded inner layer to be delaminated from the outer layer in use. The method may also comprise the step of forming ventilation holes in the outer layer so that ambient air flows in between the outer and inner layers. In order to enable the inner layer to be delaminated from the outer layer after blow molded and during use, wall thickness of the preform may be determined taking into account relevant parameters such as stretch ratio and physical properties of the materials. The inner preform will be injection molded using a mold that ensures such a wall thickness. By selecting a proper resin and wall thickness, the thus injection-and-blow molded outer preform will be capable of squeeze itself.

In case of using the method to manufacture laminated bottles each having a delaminatable inner layer, a resin of the inner preform may preferably be projected out of the through-hole of the outer preform before injection molding the inner preform. A stretching rod used to conduct the longitudinally stretching step will collapse the projection made of the resin forming the inner layer. The longitudinal stretch conducted at the step of blow molding is effective to press a bottom of a parison and to reform it as a flange disposed outside the bottom of outer layer. The inner and outer layers are thus fixedly secured to each other at the bottom. In this way, any additional step is not needed to integrate the inner and outer layers at their bottoms.

In addition, the injection molding of the inner preform may be conducted such that a plurality of thickened portions are formed integral with the preform in such a manner that each portion extends longitudinally and circumferentially. The blow molded laminated bottles will have each the inner layer that is formed integral with pillar- or rib-shaped thickened portions. Each of those thickened portions shows such an improved deformation resistance that the inner layer is not readily delaminated from the outer layer. Flat regions each interposed between the linear thickened portions of the inner layer gradually will shrink inwardly so as to provide the inner layer with uniform shrinkage and deformation over full height of each bottle. Neither a middle portion of the inner layer nor an upper end portion thereof (located close to a mouth of the bottle) will shrink sooner than the lower portion of the layer. Thus, the latter portion will be protected from being sealed not to exhaust a liquid content. Since the inner preform is injection molded herein, the forming of such thickened portions can be effected reliably to give products each having a uniform internal texture.

It is also possible to provide the inner preform with a body-shaped part that has a thickened region extending in a helical direction. This region may be a helical protrusion formed integral with the inner surface of the body-shaped part. Alternatively, a helical recess may be formed in the inner surface of the outer preform, and then the inner layer is injection molded inside the outer preform to produce the helical thickened region.

Also, an injection mold used herein to produce an outer preform for the laminated container may comprise a cavity segment with a closed bottom in combination with a core segment having a pin. This pin is intended to contact an inner surface of the closed bottom of the cavity segment. Such a type of the mold may be suited to preparation of the outer preform in the present invention. If this mold is used to form an outer layer, then a space occupied by the pin cannot be filled with a resin of this preform. Thus a through-hole will be produced to extend from an outer surface to inner surface of the outer layers preform. In short, the hole is formed through the bottom of this preform while molding same.

Alternatively, then injection mold just described above to produce the outer preform for the laminated container may comprise the core segment with a closed bottom may be employed in combination with the cavity segment having a pin to contact a closed end of the core segment.

Each of these injection molds may have the pin being capable of projecting into and being retracted from so that a gate facing the pin is clogged therewith.

The method of the invention described above may utilize the following manufacturing apparatus. This apparatus is composed of a device for injection molding the outer layer, a further device for injection molding the inner layer, and a still further device for blow molding them. A cylindrical outer preform having a bottom and a through-hole formed through the bottom is injection molded by the first-mentioned device. The further device for injection molding the inner layer injects an inner preform inside the outer preform. The still further device blow molds a parison that is formed with a bottom and composed of the outer and inner preforms, while biaxially stretching the parison longitudinally and transversely in such a way that the inner layer delaminatable from the outer layer is laminated on the inner surface thereof to provide a laminated container. The device for injection molding the inner preform may have a gate for passing a molten resin through the hole to thereby inject it from outside into the outer preform. The gate may be spaced outwards from the through-hole. Using these devices, the gate formed in a mold for injecting the inner layer is spaced a distance from the through-hole of the outer preform. A portion of the resin for the inner preform protrudes out of the hole and solidifies to be left there, when injection molding the inner preform with the further device. At the step of longitudinally and circumferentially blow molding the parison using the still further device, a stretching rod may collapse this protrusion when the parison with bottom is longitudinally stretched. Subsequently, the resin may spread on the outer surface of the outer layer's bottom to integrate the outer and inner layers at the bottom of the container. It is possible to form the inner layer using such a resin as having a lower melting point than that of the outer layer. In other word, it is now possible to choose the most preferable resin because the molten resin of the inner preform is introduced through the hole already formed in the bottom of the outer preform, so as to flow on and along the inner surface thereof.

As described above, the present invention is characterized in that the inner preform having a lower thermal deformation temperature than the molding temperature of the outer preform is molded therein after molding same. In the prior art, wherein a preform of an inner layer has been molded at first, the inner preform has tended to thermally deform itself when subsequently molding the outer preform. This drawback is overcome herein, and satisfactory preforms free from the said defect are now produced. The preform for the inner layer may be molded after having transferred the other preform for the outer layer into a further and discrete mold employed to mold the former preform.

The method of the present invention may also comprise the step of forming a through-hole that perpendicularly penetrates a bottom of the outer preform when molding same. Although the through-hole could be 'drilled' in and through the bottom of the outer preform after having molded same, through-hole may more preferably be formed at the step of molding the outer preform, reducing the number of necessary steps.

Also in the method of the present invention, an outer preform may have a through-hole formed in its bottom and penetrating it perpendicularly thereto. When an inner preform is formed inside the outer preform, a portion of the inner preform may be caused to protrude outwards through the hole. Thereafter, such a portion jutting from the inner layer bottom will be collapsed to provide a flange disposed outside the outer layer bottom, by a stretching rod during the blow molding process. Thus, the inner layer will be prevented from departing from the outer layer bottom in a stretched laminated container.

The present invention is applicable to manufacture of the laminated bottle comprising an inner layer laminated on an outer layer and having one or more ventilation holes formed in the outer layer so as to allow ambient air to flow in between the outer and inner layers. Such a method may consists of the step of injection molding a preform for the outer layer, the subsequent step of injection molding an inner preform inside the outer preform and the final step of blow molding a parison consisting of such outer and inner preforms. Those ventilation holes may be formed while injection molding the outer preform, so that the inner preform may be formed subsequently with pins inserted in the ventilation holes.

According to this method, the ventilation holes are formed when the outer preform is injection molded. Therefore, such a drawback in the prior art that the inner layer has been likely to be injured when forming the ventilation holes in the outer layer during the blow-molding step, is now resolved herein. Any works for piercing such holes one by one in the injection molded outer layer are no longer necessary, thus enhancing manufacture efficiency.

Those outer and inner layers may have respective molded configurations each composed of a body portion and a mouth portion to constitute a bottle. To protect the mouth portions of the outer and inner layers from separation from each other, a relatively large thickness of the inner layer may for instance be effective. The outer layer may be squeezable so as to readily deform itself elastically if depressed with a user's hand, or alternatively may be rigid in the event that a pump for sucking the content of bottle would be attached to the mouth portion.

In the method of the present invention, the stratified parison may preferably be blow molded in such a way that the stretching for orientation of the outer preform is effected below a portion where the ventilation holes are located. The ventilation holes in this case are protected well from deformation due to the step of stretching for orientation, lest should be closed with any amount of the resin surrounding the holes. Stretching for orientation does not take place around the ventilation holes, so that the inner layer portions present therearound may sustain the same wall thickness as that of un-stretched preform. However, the body of the inner layer for containing the content (liquid content) can however be made a thin film in shape and structure. At the same time, the inner layer portions around the holes may so thickened as to elastically restore well its natural configuration. The inner layer constructed to naturally close the ventilation holes will however be depressed readily by external air pressure. It will deform itself inwardly so as to open those holes when ambient air is allowed to enter the interlayer space through them. The ventilation holes behave as if they were valves, so that it is no longer necessary to incorporate any extra or additional valve that would increase the number of constituent parts and raise manufacture cost.

In this method of the present invention described above, various appropriate manners may be employed to make the ventilation holes solely in the outer layer. For example, the outer preform may be injection molded using a cavity segment and a core segment, and then left in the cavity segment. The inner preform will subsequently be injection molded using the cavity segment in combination with another core segment, the latter substituting for the first-mentioned core segment. Further, the ventilation holes may be formed by causing pins to contact the first core segment before the resin becomes hard at the step of injection molding the outer preform. The ventilation holes are allowed to remain closed with the pins while the inner preform is injection molded.

Such a method described above may be conducted using the following apparatus. Namely, this apparatus will be used to produce a parison to be blow molded into a delaminatable laminated container that is composed of an outer and inner preforms and has ventilation holes only in the outer layer at desired portions thereof A mold constituting this apparatus may characteristically comprise a cavity segment and core segments that can selectively be fastened to the cavity segment so as to mold the outer preform at first, and subsequently mold the inner preform. Also characteristically, this apparatus further comprises one or more pins in connection with the cavity segment in order to form the ventilation hole(s). Those pins can shift themselves between their projected position contacting the first-mentioned core segment and their retracted position embedded in the cavity segment.

Although the pins in the described example to form ventilation holes are located in connection with the cavity segment, they may alternatively be disposed in a lip segment if the apparatus has same. In this case, the pins at their retracted position will be enclosed with said lip segment.

Further in an alternative method of forming ventilation holes only in the outer preform, this preform is formed using an injection mold and then removed therefrom. This outer preform will then be inserted in a further injection mold for forming the inner preform so that pins equipped in connection with the further mold are inserted from outside into rough ventilation holes that have been formed. Inner ends of those pins will be brought into flush with the inner surface of the outer preform, before the inner preform is injection molded.

Such a method described above may be conducted using the following apparatus. Namely, this apparatus will be employed to produce a parison to be blow molded into a delaminatable laminated container that is composed of an outer and inner preforms and has ventilation holes only in the outer layer at desired portions thereof This apparatus may characteristically comprise an injection mold for forming the outer preform and a further injection mold for forming the inner preform. Pins for forming the ventilation holes are equipped in the first-mentioned mold so as to be shifted between their projected and retracted positions. The secondly-mentioned mold comprises pin-shaped stoppers that are to be inserted from outside into the ventilation holes previously formed in the outer preform.

The method described above addresses parisons that are to be blow molded to give the delaminatable types of laminated containers. However the present invention is not restricted thereto but is applicable to a variety of laminated articles (such as laminated parisons) that are injection molded and each composed of two or more resin layers. In other words, the present invention proposes a method of making ventilation holes solely in an outer layer of an injection molded laminated product having an inner layer inside the outer layer. The method characteristically comprises the steps of injection molding the outer layer and then molding the inner layer so that the ventilation holes are formed during the step of injection molding the outer layer, wherein the inner layer is injected in such a state that pins are inserted in the ventilation holes.

The parison-forming mold employed in the apparatus and method of the present invention may comprise at least one cavity segment and at least one core segment. This mold may further comprise (a) projectable member(s) that is(are) equipped in the cavity segment so as to contact the side surface of the core segment. An appropriate means may also be incorporated to drive pins preferably serving as the projectable members.

When molding the outer preform in the described mold, this preform's portions where the projectable members are temporarily located can not be filled with a resin for forming this preform. As a result, those portions will define the ventilation holes penetrating that preform from an outer surface to inner surface thereof This means that the ventilation holes as air passages can be formed already at the same time as the outer preform is molded.

The projectable member incorporated in the mold described above may be held in and by the lip segment so as to be capable of contacting the core segment's side face. Alternatively, that member may be held in and by the core segment so as to contact with the inner surface of the cavity segment or the lip segment. In any case, the projectable member may preferably be located below a threaded portion surrounding a mouth of the container that will be produced from the preform.

Also, this method of the present invention comprises the step of forming one or more ventilation holes that penetrate the outer preform from an outer surface to inner surface thereof, at the same time as this preform is molded. The ventilation holes are thus formed already at the step of forming the outer preform. The present method now eliminates the problem inherent in the prior art that has been injuring the inner layer when forming the ventilation holes in the outer layer during the blow molding step. Further, works for piercing such holes one by one in the injection molded outer layer are no longer necessary, thus enhancing manufacture efficiency.

The delaminatable inner preform is formed herein onto the inner surface of the outer preform so that, preferably, their portions located below the ventilation holes are subsequently stretched for orientation.

According to this method, inner layer portions corresponding to the ventilation holes maintain an original wall thickness, so that each of such relatively thickened portions may function as a kind of valve cooperating with the ventilation hole. Thus, manufacture process becomes simpler and less expensive, as compared with the case of preparing extra and discrete valves.

Also in the present method, an inner end of the projectable member may be located substantially in flash with the inner surface of the outer preform when the inner preform is molded using the mold described above.

Due to this feature, a resin forming the inner preform may be prevented from flowing into portions that are intended to form the ventilation holes in the outer preform.

In this manufacturing method described above, the ventilation holes may preferably be formed below a threaded portion of the outer preform.

An apparatus for manufacturing laminated containers each having a delaminatable inner layers may comprise a first injector assembly for molding an outer preform having one or more ventilation holes that pierce the preform from an outer to inner surface thereof The apparatus further comprises a second injector assembly for molding an inner preform disposed inside the outer preform and capable of being delaminated therefrom, together with a stretcher assembly for carrying out the stretching for orientation step for the preforms' portions located below the ventilation holes. Further, this apparatus may be such that those ventilation holes are formed in such portions of the outer layer that are located below its threaded portion.

THE BEST MODES OF CARRYING OUT THE INVENTION

Now some preferred embodiments of the present invention will be described referring to the accompanying drawings.

FIG. 1 shows a comb shaped product 22 comprising a laminated bottle 20 having a delaminatable inner layer that has been manufactured by a method of the present invention. The comb shaped product 22 is suited for uniformly applying a content such as a hair dye to hair. When a user grips and presses the bottle 20 to be deformed, a liquid as the content of the bottle will flow through a passage not shown but extending through a comb shaped cap 21 and will exude forth out of several holes formed in end portions of the comb. If the user stops gripping and pressing the bottle 20, it recovers its normal configuration. Such a character of the bottle 20 is called "squeezability".

Figure 2:
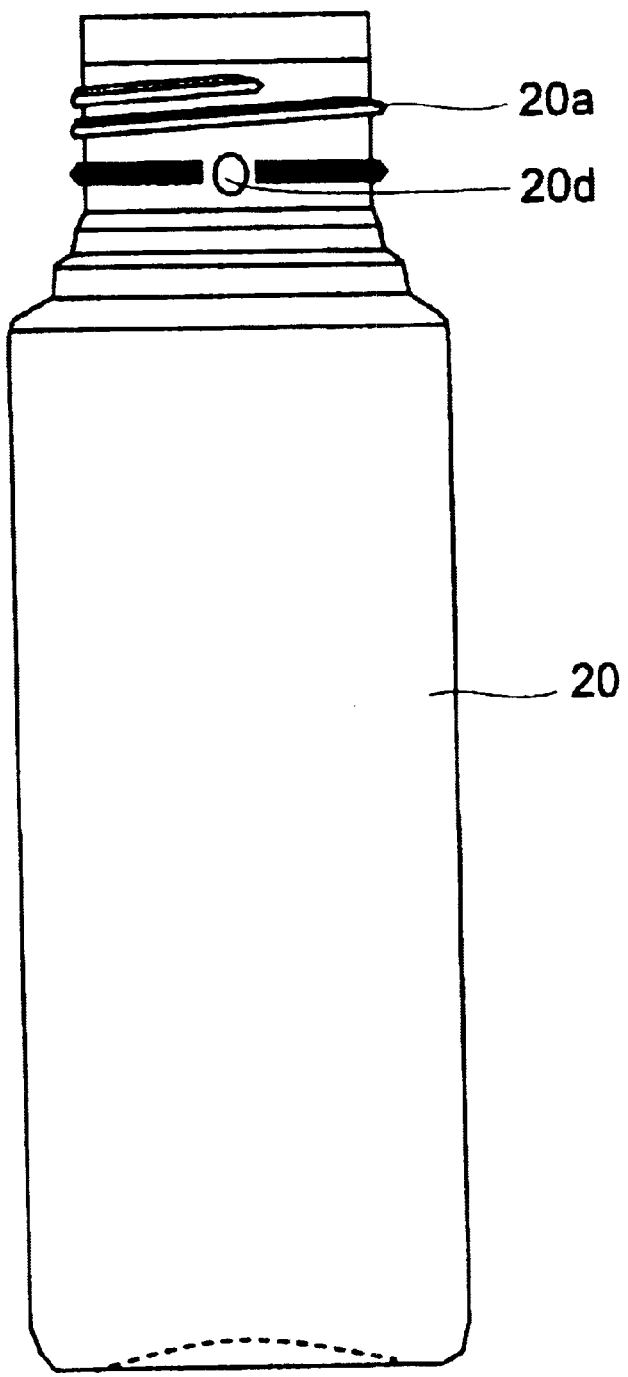
FIG. 2 also is a side elevation of the laminated bottle included in the comb shaped product shown in FIG. 1, from which a cap of the comb-like shape is removed.
Figure 3:
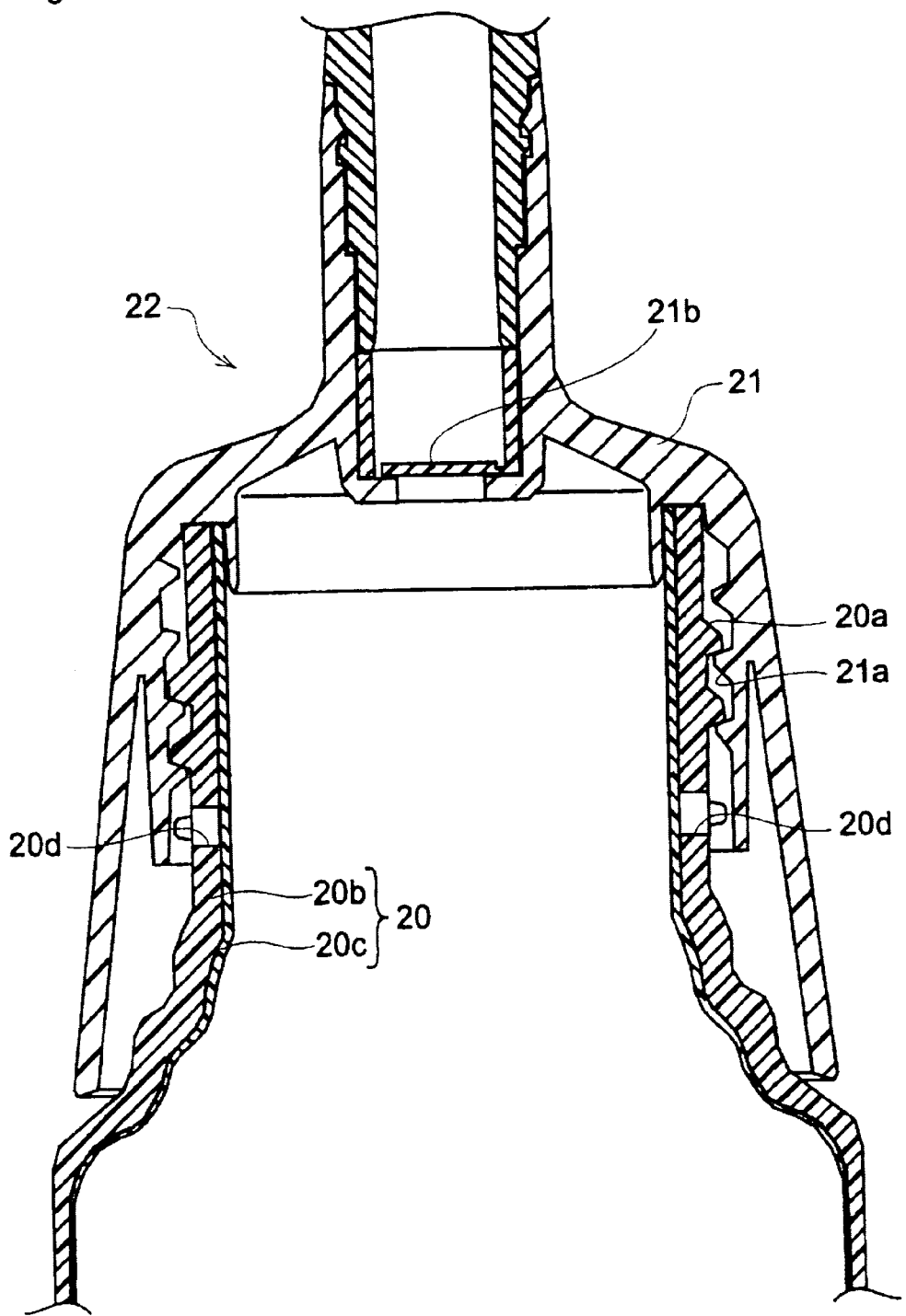
FIG. 3 is an enlarged cross section of a principal portion that is included in the comb shaped product shown in FIG. 1.

As shown in FIG. 2, the bottle 20 has a threaded portion 20a formed integral with its periphery around the bottle's mouth. As shown in FIG. 3, this threaded portion 20a is fastened into a mating threaded portion 21a formed in the comb shaped cap 21 to thereby secure it onto the bottle 20. An outer layer 20b of the bottle 20 has ventilation holes 20d so as to allow ambient air to flow into a space between the outer layer 20b and an inner layer 20c. Those ventilation holes 20d may appropriately be formed in an upper portion of the bottle's body or in a bottom thereof. In the drawings, the ventilation holes are located below the threaded portion 20a. In use of the bottle 20, its body will be depressed by a user with his or her hand or by any other way, before subsequently releasing his or her hand therefrom. As a result, ambient air will flow through the ventilation holes 20d in between the outer layer 20b and inner layer 20c, so that the inner layer will remain depressed and shrunk. The bottle body may be depressed later again while preventing ambient air from flowing into the interior of the inner layer, and be shrunk to compress air between said layers to thereby squeeze the content of this bottle.

As shown in FIG. 3, the bottle 2 is composed of the outer layer 20b and the inner layer 20c formed therein. The outer layer 20b may be made of a PET (viz., polyethylene terephthalate), an EVOH (viz., copolymer of ethylene and vinyl alcohol) or the like. The inner layer 20c is a film delaminatable from the outer layer 20b and capable of deformation relative thereto. A material for forming the inner layer may be a polyolefin resin (such as a polyethylene) of an excellent gas-barrier property. The inner layer has a melting point and a temperature of thermal deformation, both lower than those of the outer layer.

The ventilation holes 20d penetrate not the inner layer 20c but the outer layer 20b from an outer surface to an inner surface thereof. These holes may not be closed with the comb shaped cap 21.

The cap 21 is formed integral with a valve 21b facing the mouth of the bottle 20. This valve may readily open when the content inside the inner layer 20c moving into the cap 21, however, prevent the content from moving back from the cap 21 into the interior of inner layer 20c. Due to this structure, ambient air is prevented flowing into the cap 21 through holes formed in end portions of the comb.

When the user grips the laminated bottle 20 to cause deformation of the outer 20b and inner layers 20c, the content inside the inner layer 20c moves into the cap 21. If the user stops gripping and pressing the bottle 20, it recovers its normal figure. However, the inner layer 20c maintains its depressed configuration, and ambient air flows into a space between the outer 20b and inner layers 20c through the ventilation holes 20d. If and when the user depresses the bottle 20 again, these holes are closed with the inner layer 20c by the user's fingers so that the air between layers does not leak out of the bottle. Deformation of the outer layer 20b consequently decreasing its capacity may allow the air to press the inner layer 20c, subsequently its content thereof will be squeezed out into the cap 21.

Figure 4:
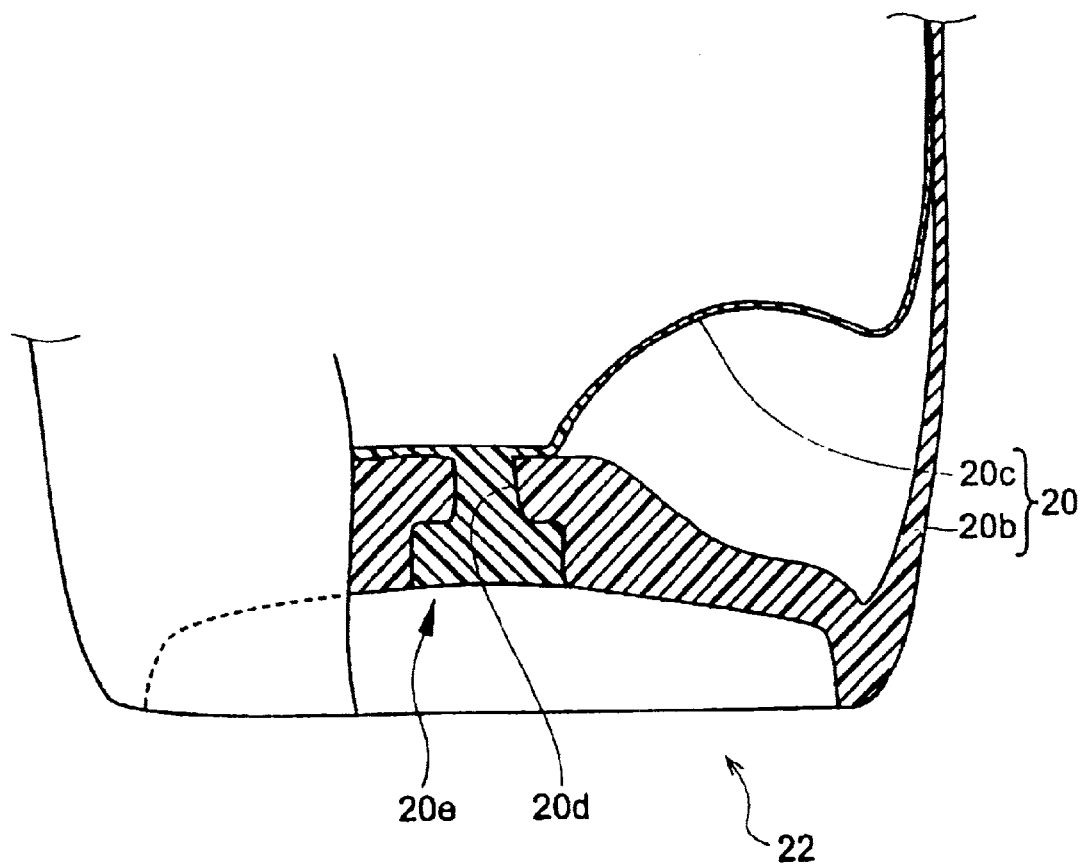
FIG. 4 is an enlarged elevation of a bottom of the bottle constituting the comb shaped product illustrated in FIG. 1 and shown partly In cross section.

In FIG. 4, the content in the inner layer 20c has partly been squeezed out. In detail, this figure shows a bottom portion of the inner layer 20c that has been delaminated from the outer layer 20b due to such a decreased capacity thereof. However, the inner and outer layers are in engagement with each other at their central bottom portions lest the inner layer 20c should come off the outer layer 20b. Such an engagement 20e is provided by the structure that the bottom portion of the inner layer 20c fixedly fits in a through-hole 20d, with this hole having been formed in the bottom of the outer layer 20b. In detail, the portion expands itself to assume a flange-like shape disposed in an outer bottom surface of the outer layer 20b.

Next, FIGS. 5 to 11 illustrate molds that are designed to form parisons and to blow mold same in order to produce laminated bottles. Also shown in these figures are a method of and an apparatus for making the laminated bottles. The laminated bottle 20 in the present embodiment will be produced by the injection-blow-molding method, wherein the injected parisons are biaxially stretched while blow molding same. A rotary plate 19 is supported on a frame not shown and intermittently driven in one way. This plate 19 will cause a lip segment 2 to circulate between an injection station (namely, an injection molding apparatus), a blowing station (viz., a blow molding apparatus), and a discharging station, sequentially in this order. This lip segment consists of split halves disengageable sideways from each other rightwards and leftwards. A driving means not shown will open or close the lip segment. This segment remaining closed will support the mouth of parison and subsequently support the laminated bottle obtained by stretching the parison. The bottom surface of the rotary plate 19 holds the lip segment in place.

At the injection station (viz., in the injection molding apparatus), the outer and inner preforms are molded. In this embodiment, the injection station is divided into a first injection station for molding the outer preform (viz., an apparatus for injection molding the outer layer) and a second injection station for molding the inner preform (viz., a further apparatus for molding the inner layer). In detail, the injection molded outer preform will be removed at first by opening its mold. Then, this preform will be taken out and inserted into a mold for forming the inner preform, so that it is injection molded to provide the parison to be blow molded subsequently.

Figure 5:
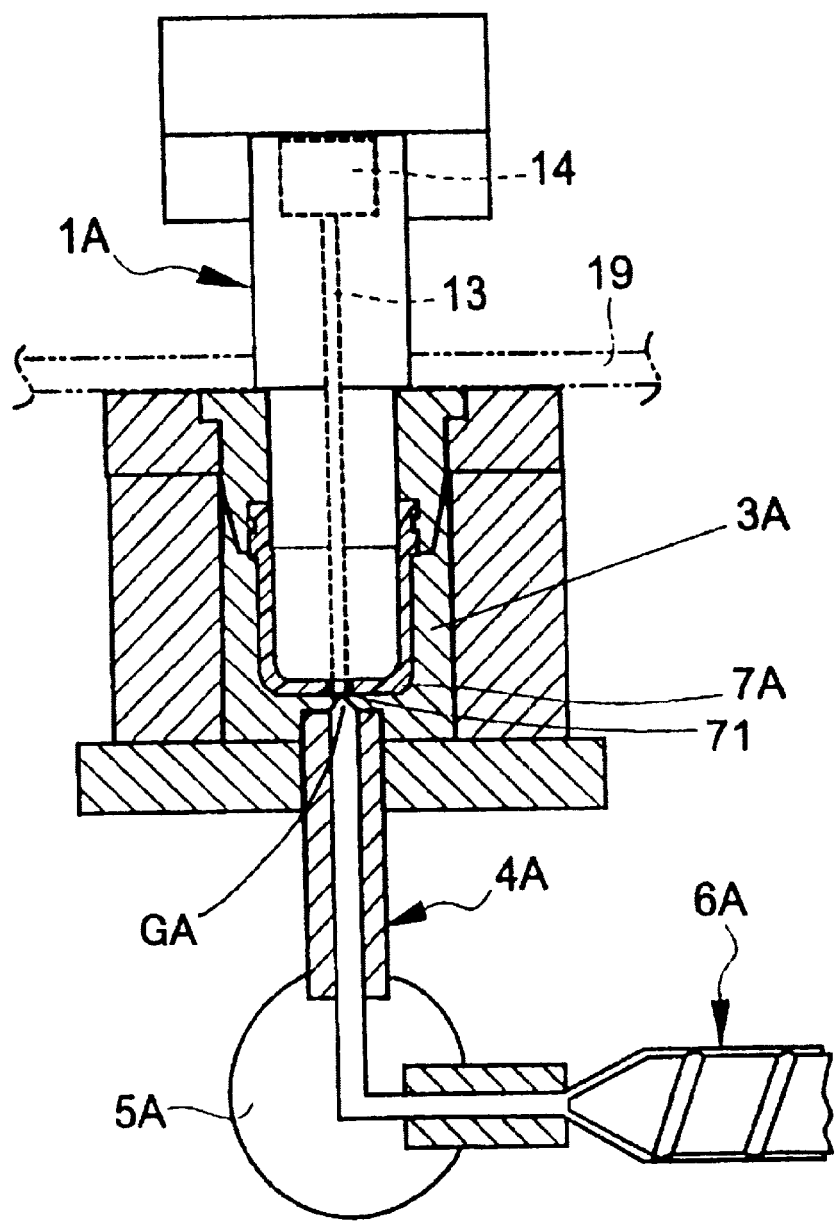
FIG. 5 is a scheme illustrating an injection step performed at an injection station employed in an embodiment of the present invention (so as to mold a preform constituting an outer layer)
Figure 6:
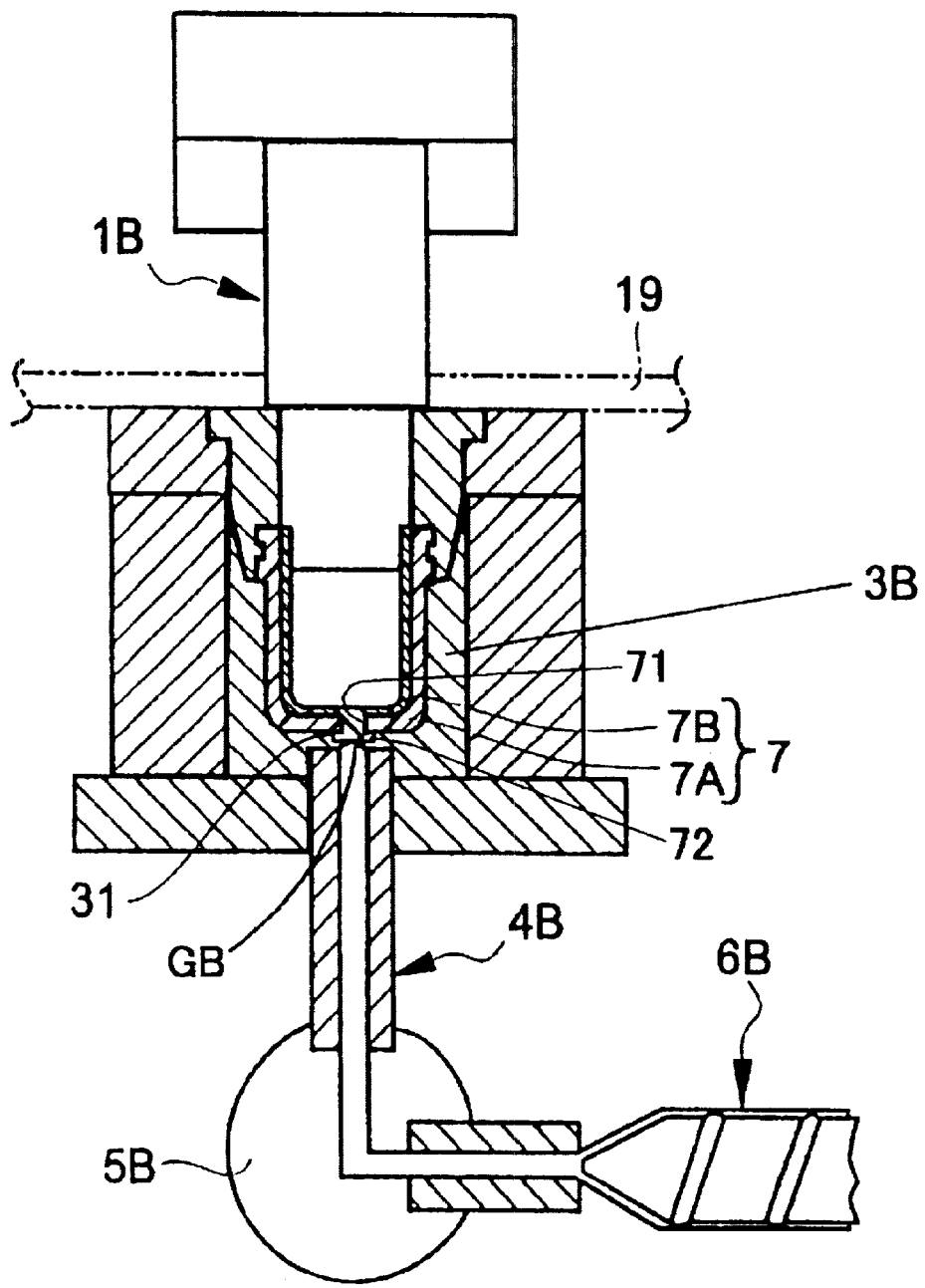
FIG. 6 also is a scheme illustrating another injection step performed at the injection station (so as to mold a preform constituting an inner layer)

FIGS. 5 and 6 show the process of forming the outer preform 7A at the first injection station. In the drawings, an injection core segment 1A (viz., a male mold), the lip segment 2, and a cavity segment 3A (viz., a female mold) are disposed up and down in this order. After fastening these segments to each other in this way, a molten resin is injected from a nozzle 6A into the cavity through a hot runner 5A, a nozzle 4A thereof and a gate 'GA' to produce the outer preform 7A.

The injection core 1A (the core segment) has a bore 3a for receiving a stick-shaped member, with this bore formed longitudinally of the core extending through a central region thereof. A stick-shaped pin 13 (viz., a first pin) is slidably held in that bore 3a, in such state that said pin 13 is displaceable between a retracted position where the pin will be retracted into the core segment 1A and a projected position where it will protrude from this segment to enter and seal the gate 'GA'. After the cavity segment is filled with an amount of molten resin, the pin 13 facing the gate 'GA' will be forced into the cavity segment so as to close the outlet of the hot runner nozzle 4A.

A bottom portion that is temporarily occupied by the pin 13 can not be filled with the resin for forming the outer preform 7A. This portion will define a through-hole 71 in the bottom of the outer preform 7A. This means that the through-hole can already be formed using the pin 13 at the step of molding the preform 7A. The pin is capable of projecting and being retracted by means of a solenoid 14 in this embodiment. This solenoid will be actuated with an electric current so as to cause the pin 13 to project towards the cavity segment. By ceasing application of electric current to and through the solenoid, the rod-shaped member 13 will be retracted out of the cavity segment. It is a matter of course that a spring for urging the pin towards its retracted position can be combined with a means for supplying a compressed air for forcing the pin 13 to protrude. Alternatively, a compression spring may be used to always urge the pin to protrude, in combination of the pin itself 13 so that pressure of the resin being injected displaces this pin away from the nozzle. In this case, injection of the resin will subsequently be interrupted to lower that pressure to thereby release the spring and close the nozzle.

Figure 11:
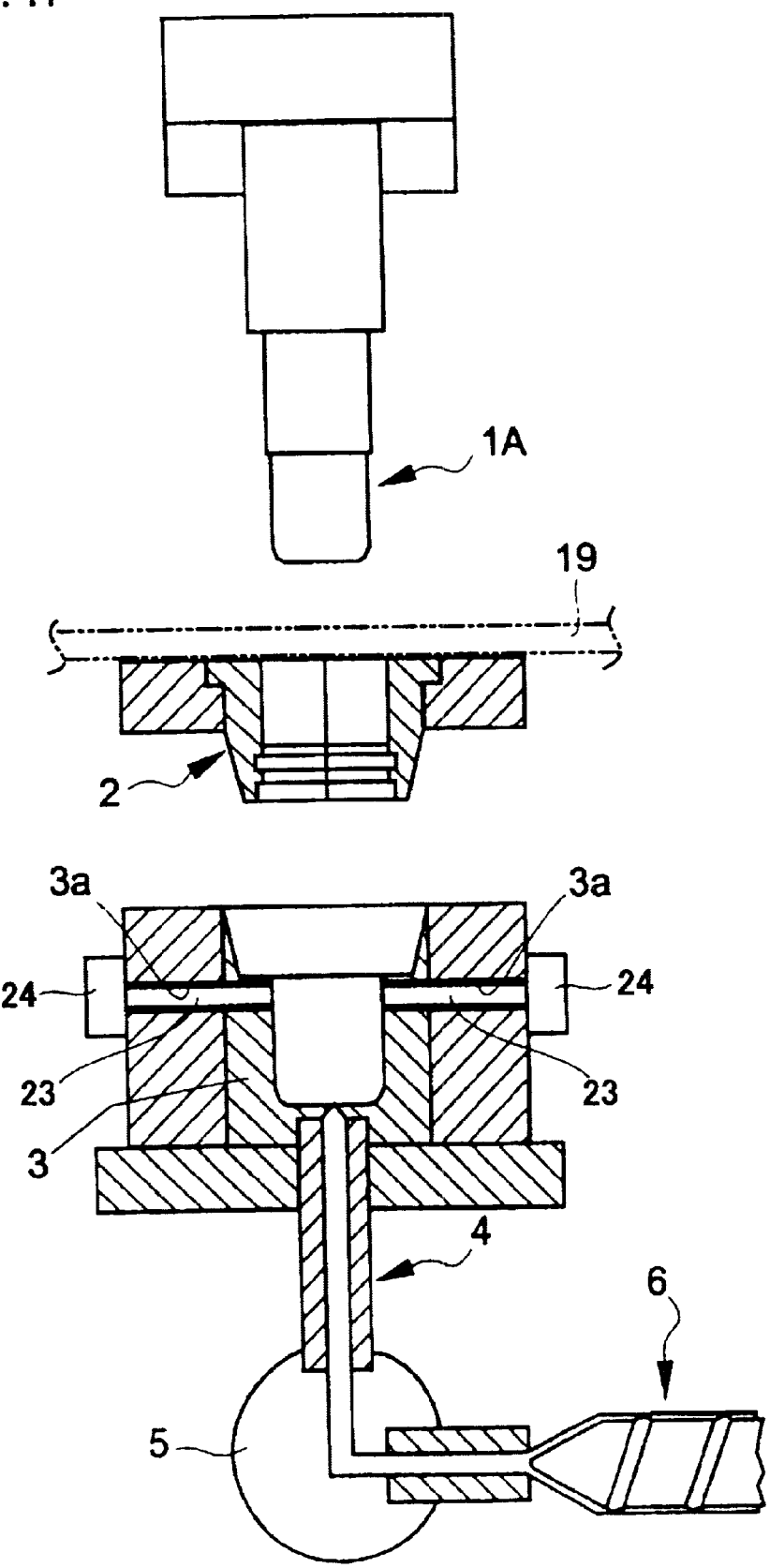
FIG. 11 is a scheme of the step of fastening mold segments together at an injection station (before molding an outer preform) in another embodiment of the present invention.

It may be possible to use pins (viz., second pins) carried by and in the mold for the purpose of forming the ventilation holes 20d in the delaminatable bottle, when the outer preform 7A is injection molded. In this case, those holes are preferably formed in regions located near the mouth, or more preferably in regions located adjacent to but below the threaded portion, because those portions will not be stretched during the step of blow molding. Instead, various prior art techniques may be employed to form such ventilation holes. The forming of ventilation holes 20d in the outer layer may be conducted later at a subsequent discrete step or simultaneously with the step of injection molding the outer preform 7A. Desirably, those projectable-and-retractable second pins 23 may be disposed in the cavity segment 3 of the injection mold for the outer preform 7A as shown in FIG. 11.

The preform 7A in which the through-hole 71 has been formed will then be pulled out of the cavity mold 3A and transferred to a second injection station. Subsequently, that preform 7A will be inserted into another mold for forming the inner preform.

FIG. 6 illustrates how to form the inner preform 7B at the second injection station. In this figure of the drawings, the injection core 1B, the lip segment 2 and the cavity segment 3B are arranged up and down in this order. After having fastened these members to each other in this manner, an amount of another molten resin will be injected through a nozzle 6B. This resin is caused to advance through a hot runner 5B and a nozzle 4B and into the cavity where the inner preform 7B is to be formed. The injection core 1B has a distal end that is for insertion into the cavity, and this end has a diameter smaller than that of the other injection core's 1A similar distal end, by an extent corresponding to wall thickness of the preform 7B. The cavity segment 3B has a recess 31 facing the through-hole 71 that has been formed in the perform 7A. A gate GB is formed on the bottom surface of the recess 31. Accordingly, the gate GB is spaced downwards and outwards from the through-hole 71 and a flange 72 made of the resin forming the inner preform 7B is disposed out of the through-hole 71 in the outer preform 7A. In the example shown in the drawings, the flange 72 protrudes outwards from the through-hole 71, though another fashion of injection molding may alternatively be employed so that the flange has its outer end surface in flush with the outer surface of the outer preform 7A.

Both the through-hole 71 and the recess 31 will thus be filled with the molten resin forming the inner preform 7B. A portion of the amount of molten resin enters the through-hole 71 and bulges out on the outer bottom surface of the outer preform 7A. The mold for forming the inner preform 7B may not necessarily be specially designed as to its gate 'GB', but any ordinary pin gate (viz., direct gate) may be employed.

The mold having operated to form the inner preform 7B will then be opened, but allowing the lip segment 2 to continue to hold a parison 7 consisting of the outer and inner preforms 7A and 7B.

Figure 7:
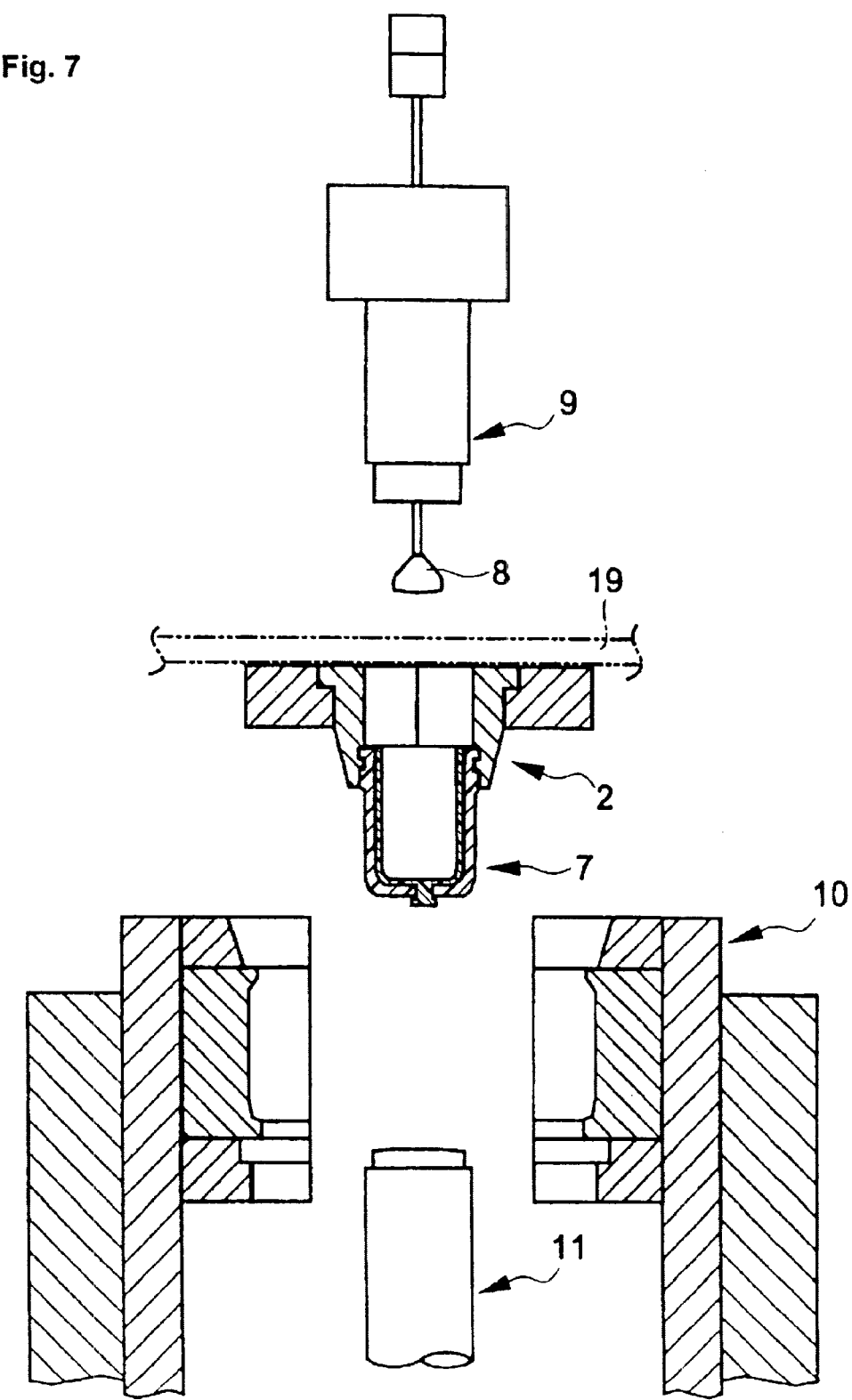
FIG. 7 is a scheme of a blowing station where an integrated preform is being moved at the transfer step.
Figure 8:
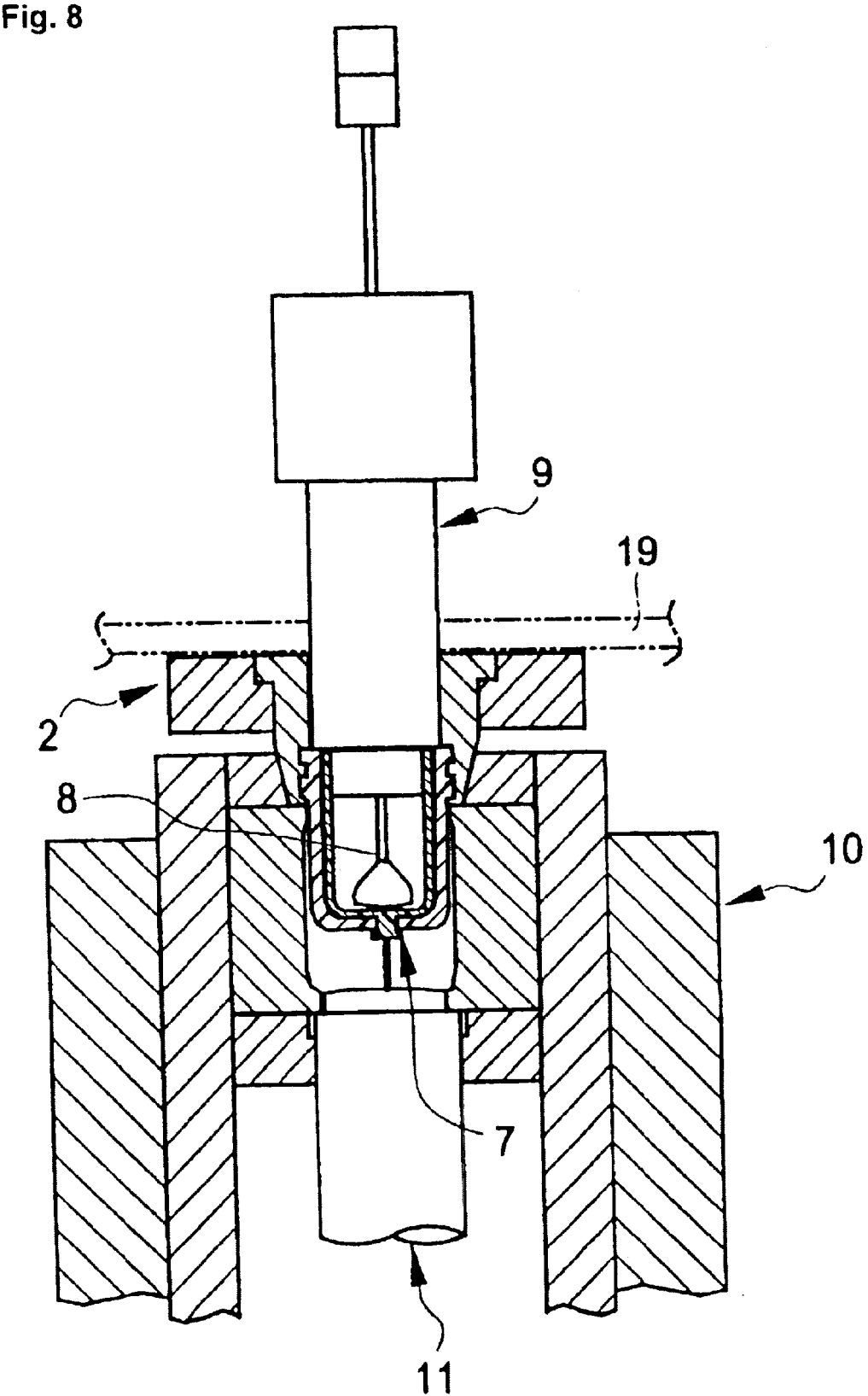
FIG. 8 is likewise a scheme of a clamping-and-stretching step carried out at the blowing station.
Figure 9:
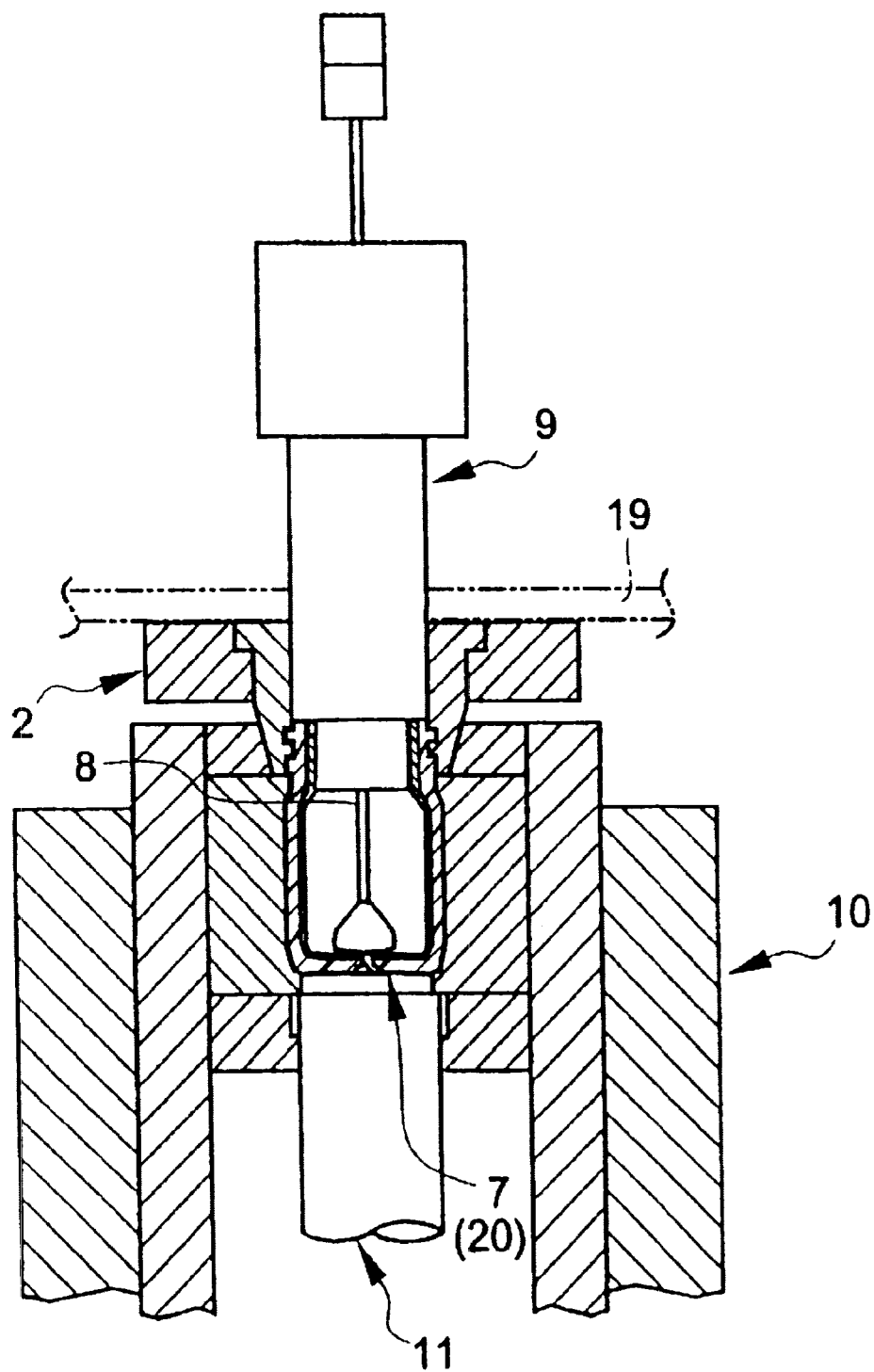
FIG. 9 is a similar scheme of a blowing-and-cooling step also carried out at the blowing station.

At the blowing station shown in FIGS. 7 to 9, a blow core segment 9 having a stretching rod 8 attached thereto, the lip segment 2 for holding the parison 7, a blow cavity segment 10, and a bottom segment 11 are arranged up and down in this order. After fixing these segments to each other and then placing the parison 7 in the blow cavity segment 10, the parison 7 will be heated. Subsequently, the stretching rod 8 is driven to move downwards to insert its end portion in the parison 7. This rod will push a bottom of the cylindrical parison 7 downward to effect the so-called 'longitudinal stretching'. At the same time, the rod transversely stretches the parison by allowing the air to flow into it through the blow core segment 9 in order to 'transverse stretching', thereby biaxially orientating the resin molecules.

Figure 10:
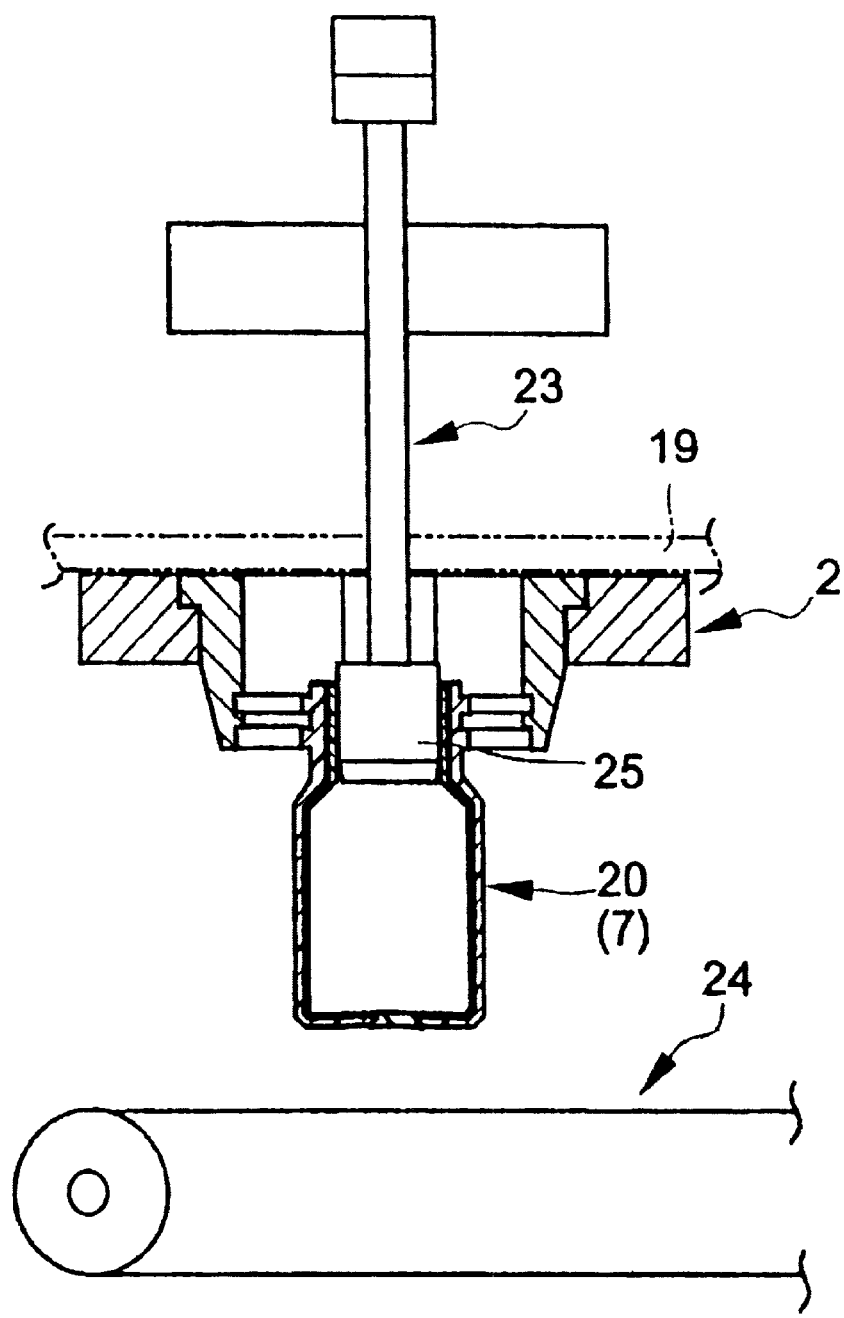
FIG. 10 is a scheme of an ejection step that is carried out at an ejection station so as to take out a molded product.

At a discharging station for taking out molded products as shown in FIG. 10, an ejector rod 23, the lip segment 2 for holding a laminated bottle, and a transporting apparatus 24 like a conveyor belt are arranged up and down in this order. The ejector rod has an ejecting foot 25 at its distal end. This foot 25 will be fitted in the mouth of bottle 20, before opening the lip segment 2 in a horizontal direction to lay the bottle on the conveyor.

As described above, the present invention is characterized in that the inner preform 7B having a lower thermal deformation temperature than the molding temperature of the outer preform 7A is molded therein after molding same. In the prior art, wherein a preform of an inner layer has been molded at first, the inner preform has tended to thermally deform itself when subsequently molding the outer preform. This drawback is overcome herein, and satisfactory preforms free from the said defect are now produced. In a case wherein the mold as shown in FIG. 5 is used to prepare the outer preform 7A, the latter will have the through-hole 71 penetrating its bottom. Any drilling work that would otherwise be necessary can now be dispensed with to improve manufacture efficiency. A portion of molten resin forming the inner preform 7B will flow through the hole 71 to form a bulge on the outer bottom surface of the outer preform 7A, when the former preform is molded inside the latter having that hole. The stretching step conducted at the blow molding station will depress the bulge. This depressed bulge as a portion of an inner layer 20c constituting a stretched laminated bottle 20 will thus provide a flange present on that outer bottom surface of an outer layer 20b. Due to this feature, the inner layer 20c is inhibited from disengaging from the bottom of outer layer 20b.

In the embodiment described above, the first injection station for preparation of the outer preform 7A is distinct from the second one for the inner preform 7B. However, only one and the same station may be used to mold the latter preform 7B after molding the former 7A. In detail, the injection core 1A will be pulled out for subsequent insertion of another core for molding the inner layer. A resin passage for guiding the molten resin for the inner layer 7B to be injected into the cavity segment may be provided in and through the latter injection core.

The pin 13 disposed in the injection core 1A in the embodiment described above may alternatively be disposed in the cavity segment 3A. In a case wherein the pin is arranged not to face the outlet of molten resin, it can be fixed in the injection core 1A or cavity segment 3A. The present method in the described example is applied to manufacture of the laminated container comprising the single outer layer and the single inner layer. However, it may be used to manufacture the container of another type whose outer and/or inner layers are respectively composed of two or more layers or strata.

In the embodiment described above, the gate 'GB' of the mold for injecting the inner layer is disposed in the cavity segment 3B. The gate GB may alternatively be located in the core segment 1B, and preferably be arranged at the central end portion (distal end) thereof. Due to this feature, it is unnecessary to make the through-hole in the outer preform 7A.

Figure 12:
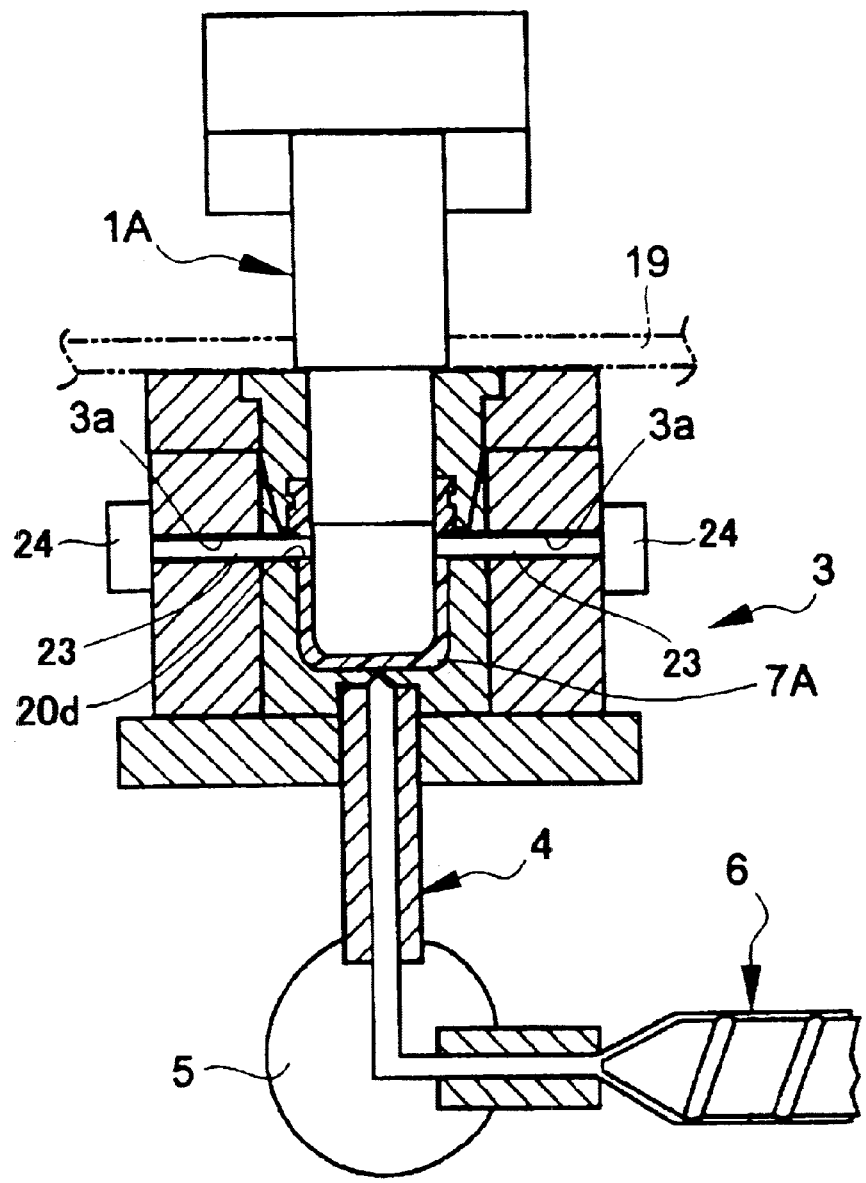
FIG. 12 is a scheme illustrating an injection step performed at the injection station (to mold the outer preform)

FIGS. 11 to 17 show further embodiments in which the inner preform is molded at the same place by exchanging the injection core with another one after the outer preform has been molded. In this regard, it is to be noted that in the preceding embodiments the outer and inner preforms are molded at discrete and respective injection stations. FIGS. 11 and 12 illustrate the step of molding the outer preform 7A. In these figures, the injection core 1A, the lip segment 2, and the cavity segment 3 are arranged up and down in this order. After fastening the mold to engage these segments with each other in a vertical direction, the molten resin is injected from a nozzle 6. The injected molten resin flows into the cavity through a hot runner 5 and a nozzle 4 thereof to prepare the outer preform 7A.

The cavity segment 3 comprises a couple of horizontally formed apertures for receiving two pins 3a. The apertures 3a hold respective projectable members slidable therein, and those members may be second pins 23. A distal end of each second pin 23 will protrude inwards to contact the core segment when charging the molten resin (before or after the beginning of charge). These pins 23 form ventilation holes 20d at the step of molding the outer preform 7A. In this embodiment, solenoids 24 will drive the pins 23 to be retracted and projected. For example, these solenoids each will be actuated with an electric current so as to cause each pin 23 to protrude towards the cavity segment and contact the core segment 1A. By ceasing application of electric current to and through the solenoid, each pin 23 will be retracted away from the cavity segment. It is a matter of course that a combination of a spring for urging the pin towards its retracted position with a means for supplying a compressed air forcing the pins 23 to protrude may be employed. Alternatively, a distal end surface of each pin 23 may be recessed corresponding to curvature of the injection core 1A.

Figure 13:
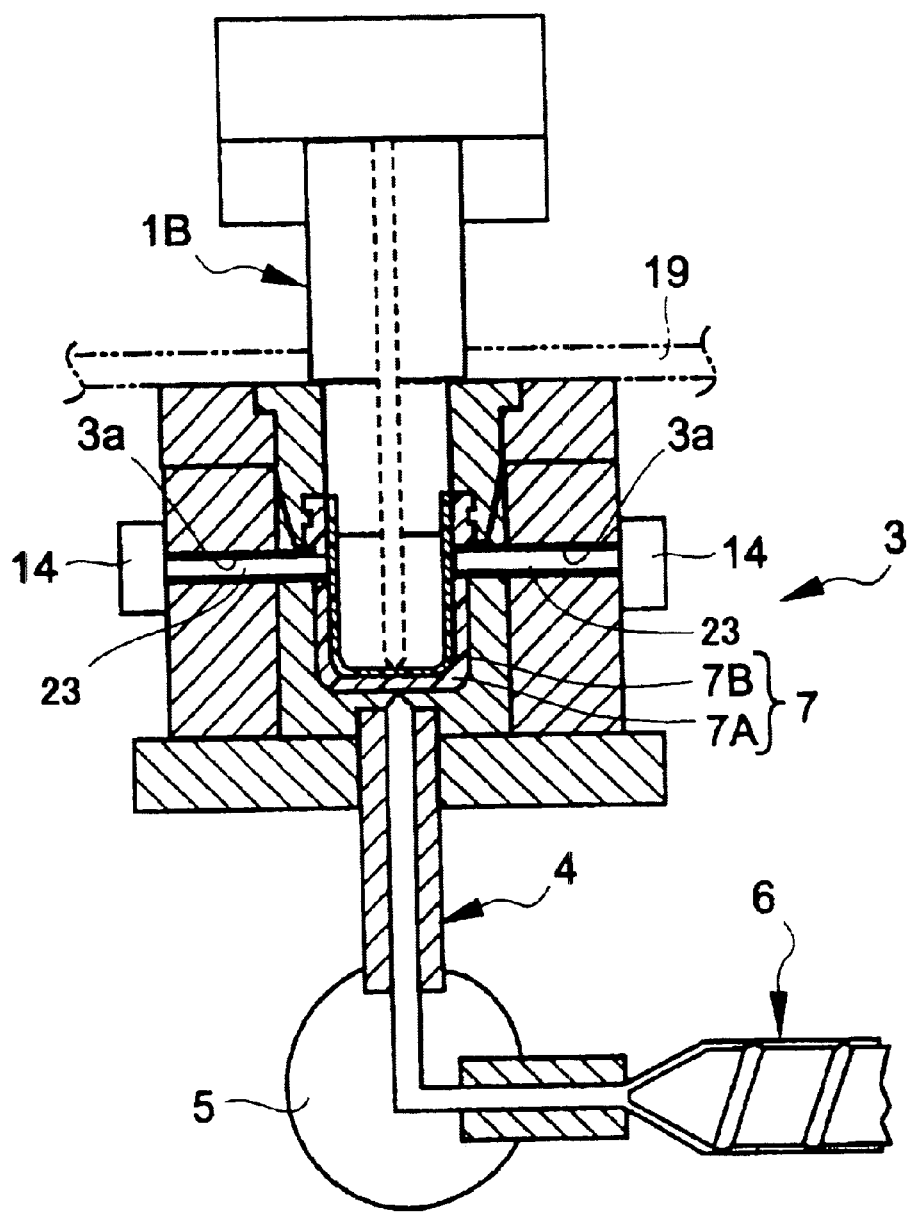
FIG. 13 also is a scheme illustrating another injection step performed at the injection station (to mold an inner preform)

FIG. 13 shows the manner of molding the inner preform 7B. The injection core 1A has been pulled out, and another core 1B is subsequently inserted as shown in this figure. The lip segment 2 and cavity segment 3 are the same as those used to mold the outer preform. As for the pins 23, they are shown at the same positions as those shown in FIGS. 11 and 12. In other words, their distal ends are arranged to be substantially in flush with the inner surface of the outer preform 7A. The injection core's 1B end portion entering the cavity segment has a diameter smaller than that of the core's 1A end, providing a difference between them corresponding to the wall thickness of the inner preform 7B. Also, the injection core 1B has a passage for guiding the molten resin into the cavity segment for molding the inner preform 7B (shown by dotted lines in the figure). As described above, the distal end of each pin 23 is kept generally in flush with the inner surface of the outer preform 7A while molding it, so that the molten resin of the inner preform 7B is prevented from flowing into the ventilation holes 20d of the former preform.

After molding the inner preform 7B, the pin 23 will be retracted to open the mold. Both the preforms 7A and 7B (a combination of 7A with 7B is called 'parison 7' hereafter) are however gripped with and held by the lip segment 2, even after opening the mold.

Figure 14:
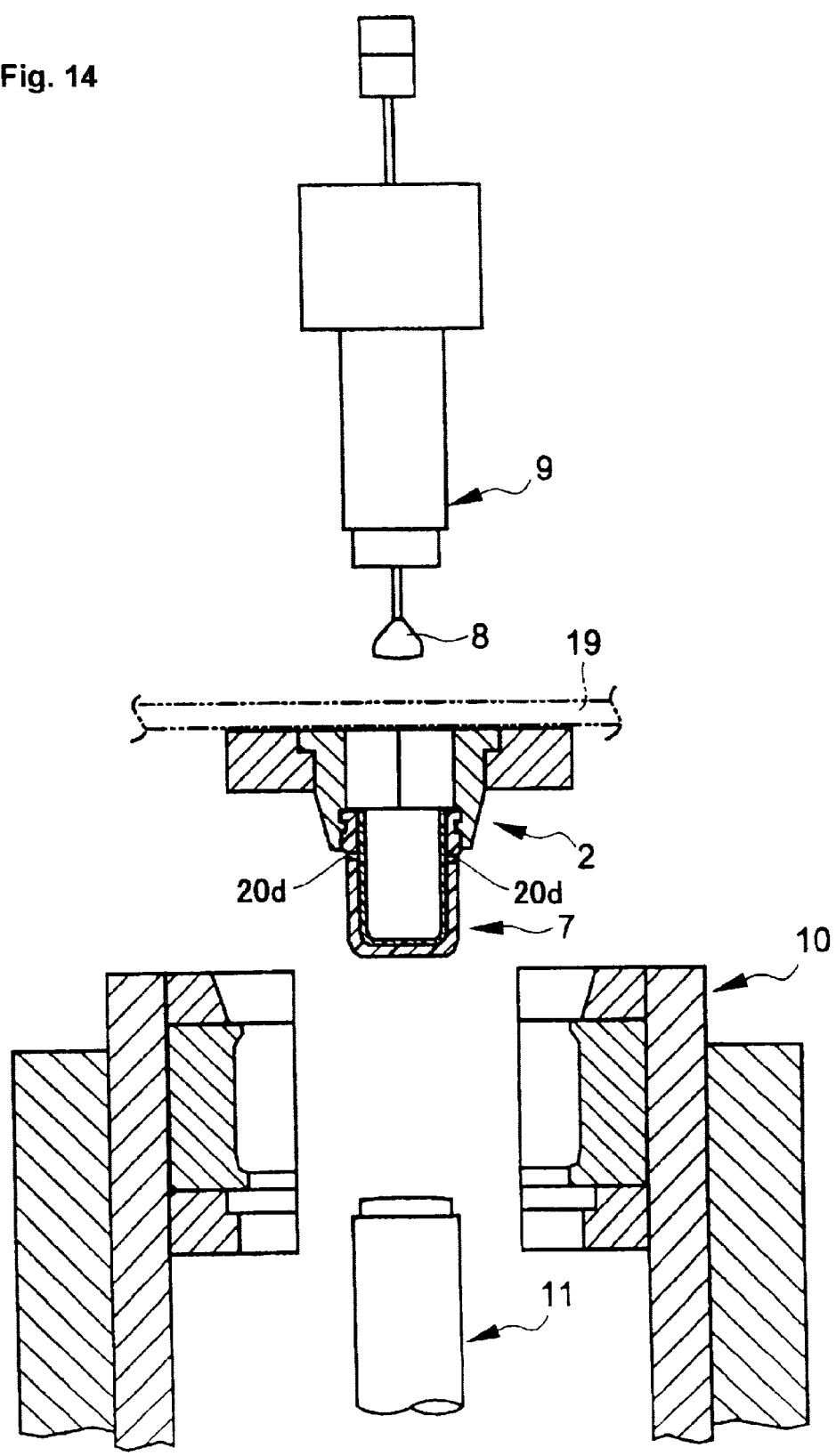
FIG. 14 is a scheme of the transfer step of transferring an integrated preform (viz., parison) at a blowing station.
Figure 15:
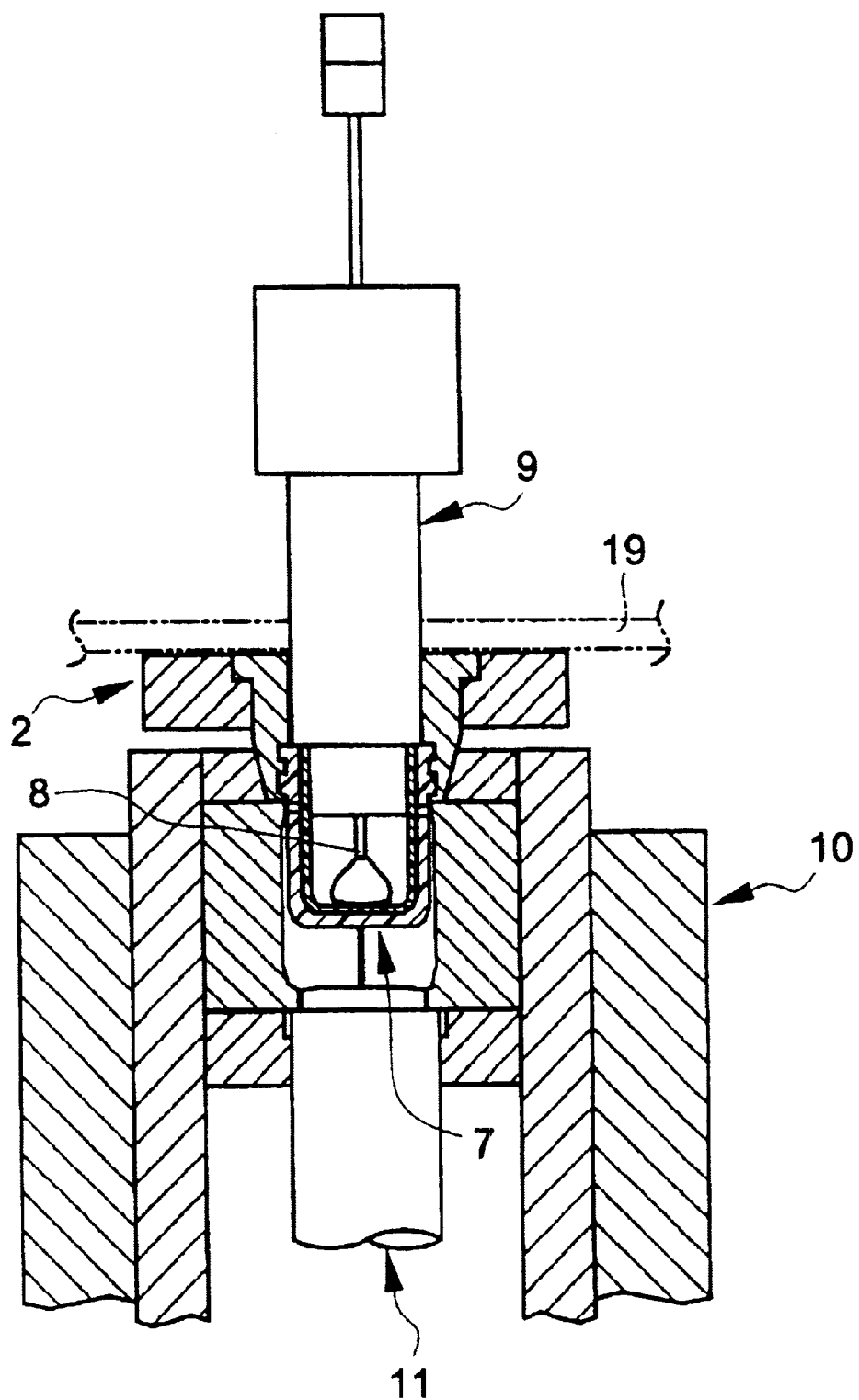
FIG. 15 is likewise a scheme of the step of clamping and stretching the parison at the blowing station.
Figure 16:
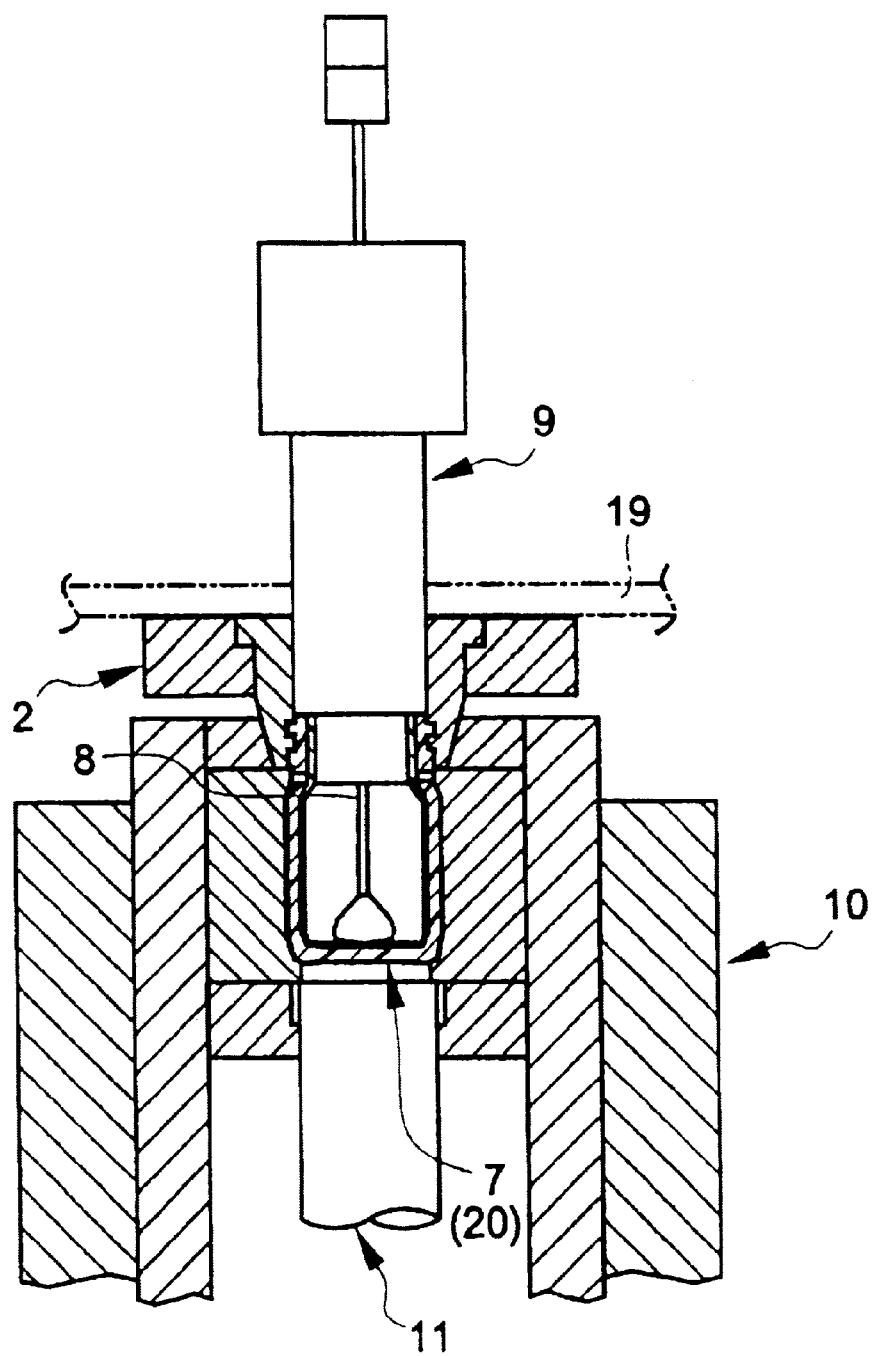
FIG. 16 is a similar scheme of the step of blowing and cooling the stretched parison at the blowing station.

At the blow station shown in FIGS. 14 to 16, a blow core segment having a stretching rod, the lip segment temporarily holding the parison 7, a blow cavity segment 10 and a bottom segment 11 are arranged up and down in this order. After engaging them with each other and putting the parison 7 into the blow cavity segment 10, the stretching rod 8 will be driven to have its distal end inserted into the parison 7. This rod 8 will subsequently stretch the parison in a longitudinal direction by pressing down the bottom thereof This parison 7 is simultaneously stretched also in a transverse direction with a compressed air blown through the blow core segment 9 and into said parison. In this state, the region or portion (near the lower portion of the container's mouth) where the ventilation holes 20d are located is firmly held in the segments. Therefore, the stretching for orientation will not take place in the region adjacent to those ventilation holes. After completion of this stretching step for orientation, the laminated bottle will cooled down to give a finished product.

Figure 17:
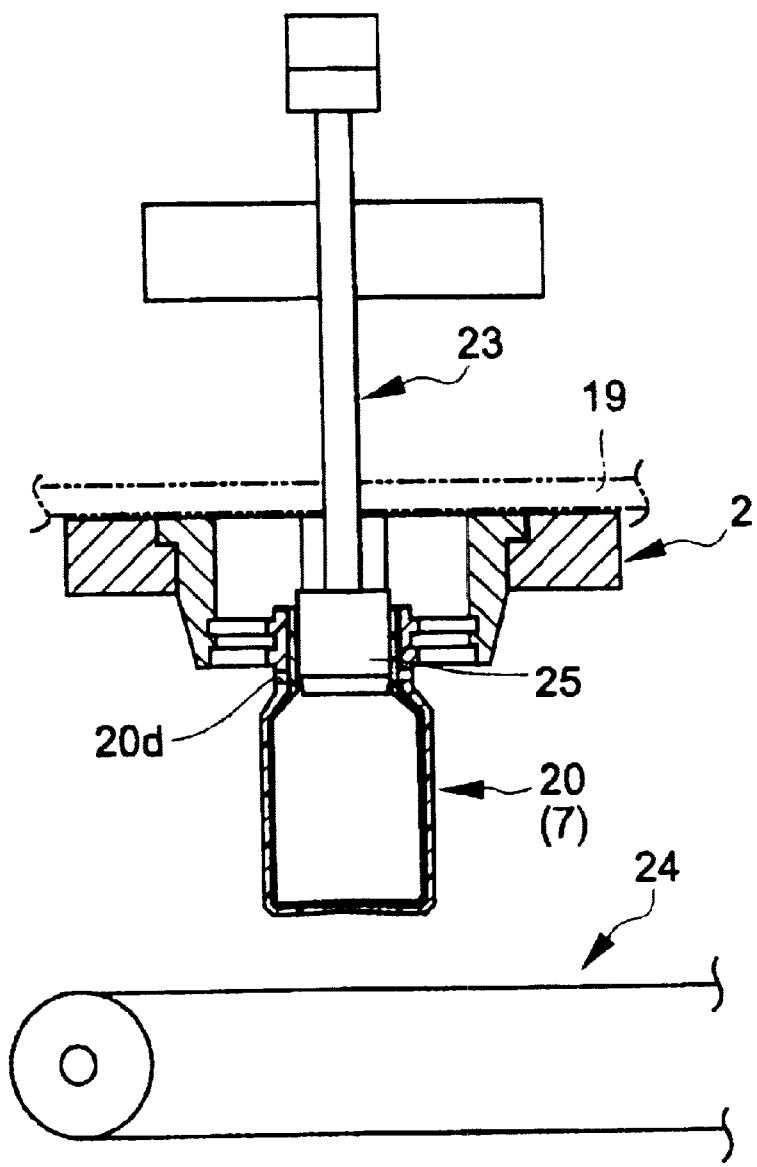
FIG. 17 is a scheme of the step of ejecting a finished product at an ejection station so as to take it out.

At the discharging station shown in FIG. 17, an ejector rod 23, the lip segment 2 holding the laminated bottle 20 and a transporting apparatus 24 like a conveyor belt are arranged up and down in this order. An ejecting foot of the rod 25 will be fitted in the mouth of bottle 20, before opening the lip segment 2 sideways to lay the bottle on the conveyor 24.

As discussed above in detail, the ventilation holes 20d are formed at the step of molding the outer preform 7A. This method wherein those holes 20d are produced when the outer preform is blow molded does therefore eliminate any problem that the inner layer has been injured in the prior art when forming the ventilation holes in the outer layer during the blow molding step. Further, works for piercing such holes one by one in the injection molded outer layer 20b after completing the laminated bottle 20 are no longer necessary, thus enhancing manufacture efficiency. After molding the delaminatable inner preform on the inner surface of the outer preform, the stretching for orientation of the preforms is carried out only for a region thereof located below the ventilation holes 20d. Thus, the inner layer's portion located in a remainder region where the ventilation holes in the outer layer are present will keep its original or 'non-stretched' thickness. Such a relatively thicker portion may function as 'valves' cooperating with those ventilation holes 20d, so that manufacture process is now rendered simpler and inexpensive as compared with the case of preparing discrete valves. In addition, the inner end of the pin 23 is positioned herein to be generally in flush with the inner surface of the outer preform 7A during the molding of inner preform 7B. Due to this feature, the resin forming this preform 7B is prevented from filling spaces where the ventilation holes 20d are to be formed in the outer preform 7A.

In the described embodiment, the inner preform 7B is molded at one and the same station where the outer preform 7A has been molded, but necessitating another injection core. Alternatively, such an injection station may be divided into a first and second injection stations so that first station (i.e., first injection apparatus) operates to mold the outer preform 7A. In this case, the second injection station (i.e., second injection apparatus) will operate to mold the inner preform 7B. In detail, the outer preform 7A just molded will be removed from the first station's mold, and then transferred into the second station's mold so as to be laminated with the inner preform 7B. In this case, clogging pins capable of insertion into the ventilation holes of outer preform may be employed and incorporated in the mold of the second station for injection molding the inner preform. The outer preform has to be placed in the second mold in such a manner that its ventilation holes are exactly aligned with those pins, which are subsequently inserted from outside so as to have their inner ends generally in flush with the inner surface of outer preform. The inner preform is laminated on the inner surface of the outer preform.

In an also preferable example, the inner preform 7B has its upper end portion extending beyond the upper rim of outer preform 7A and bent down there to reach the upper end of the threaded portion 20a. In this example, the lip segment 2 will be replaced with another or extra lip segment, after cooling down the outer preform 7A. Such an extra lip segment will provide a clearance between it and the outer and upper regional surface of the outer layer's 7A threaded portion 20a. The resin forming the inner preform 7B will flow into this clearance to produce such a bent-down top for this preform.

The pins 13 disposed in the cavity segment 3 in the embodiment described above may be replaced with another pair of pins 23 contacting the sides of injection core 1A. Alternatively, these pins 23 may be equipped in the injection core 1A in such a way as to be in contact with the inner surface of the cavity segment 3 or lip segment 2. Since the lip segment 2 can be split into halves in a transverse direction, appropriate protrusions fixed in and extending in this direction will contact the core segment IA when it takes a fastened position. In the example shown in FIG. 13, the molten resin forming the inner preform 7B is injected through a passage formed in the injection core 1B. However, this resin may alternatively be injected from a through-hole opened in the bottom of the outer preform 7A. The present method applied to the laminated container comprising the single outer and inner layers in the described embodiments and examples, can also be used to manufacture any other type container whose outer and/or inner layers are composed each of two or more layers or strata.

Figure 18:
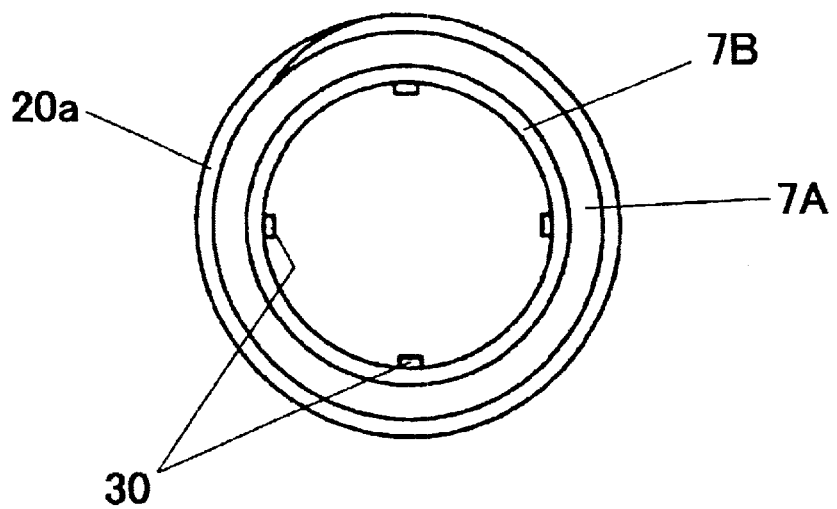
FIG. 18 is a plan view of an example of the parison used in the method of making the laminated bottle according to the present invention.
Figure 19:
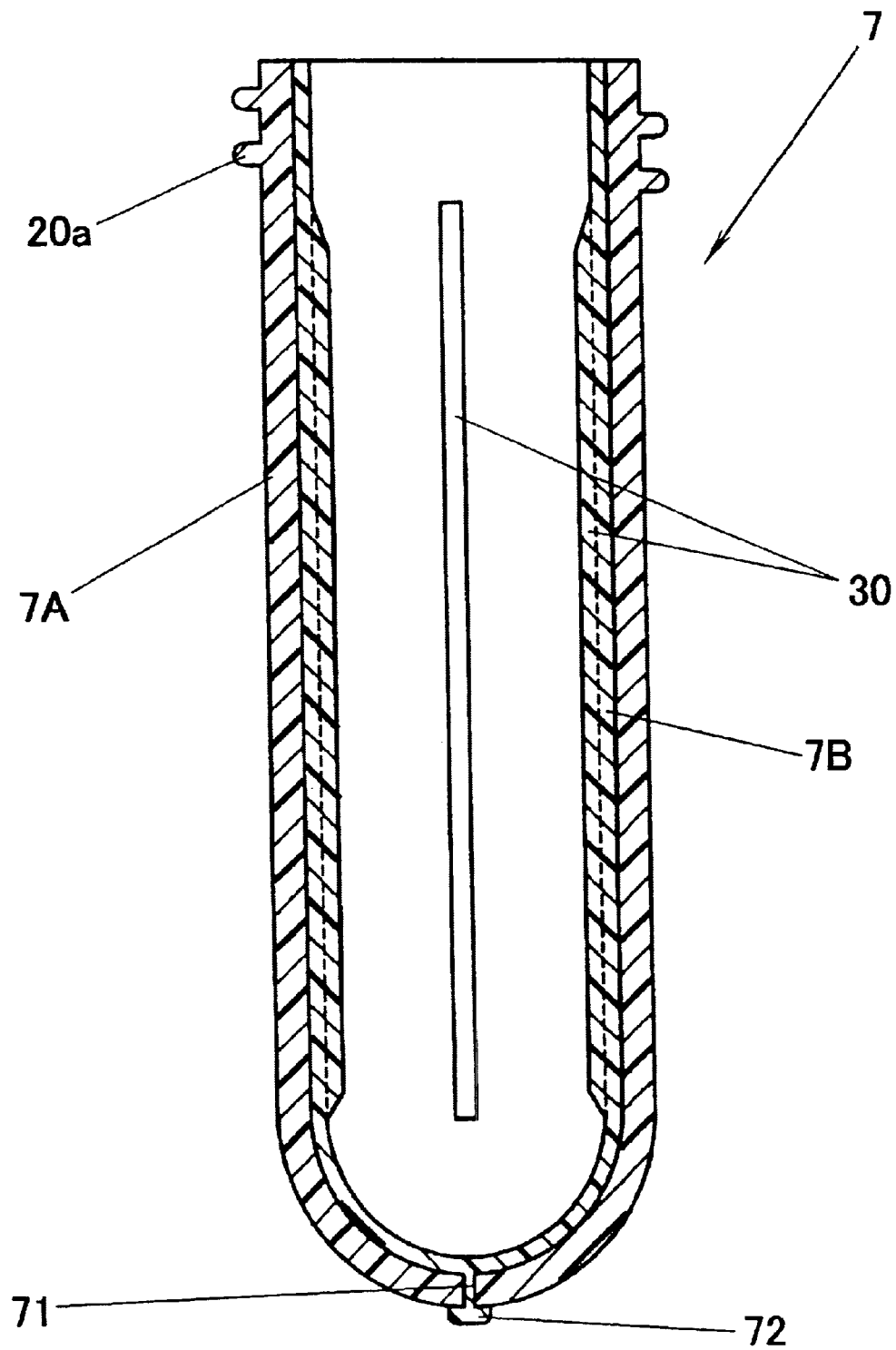
FIG. 19 is a vertical cross section of the parison shown in FIG. 18.

The injection mold core segment for molding the inner preform 7B may have at its outer periphery a plurality of vertical grooves (extending up and down). In this case, several thickened wall portions 30 will be produced on the preform to respectively extend up and down at angular intervals as shown in FIGS. 18 and 19. Although the number of those rib-shaped thick portions 30 is 'four' in the illustrated example, it may be 'two', 'three', 'five' or more. A parison of this configuration will be blow molded to give a finished product that has an inner layer 20c comprising vertical thick portions arranged at angular intervals. If a simply flat inner layer 20c lacking in such thickened portions is depressed to assume a shrunk appearance in use, then its middle region or upper end region would be highly likely to be depressed at first to choke the bottle to thereby hinder subsequent discharge of the content. However in the case just mentioned above, it is sure that the content will be exhausted thoroughly and smoothly.

Figure 20:
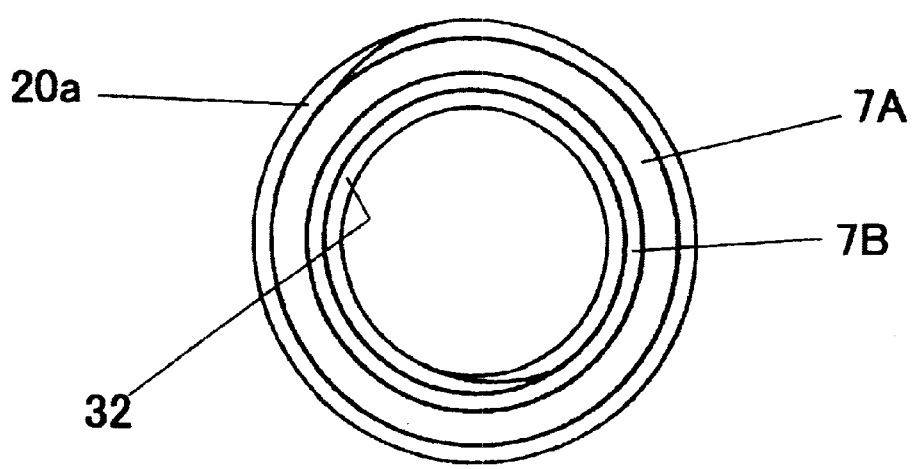
FIG. 20 is a plan view of another example of the parison used in the method of making the laminated bottle according to the present invention.
Figure 21:
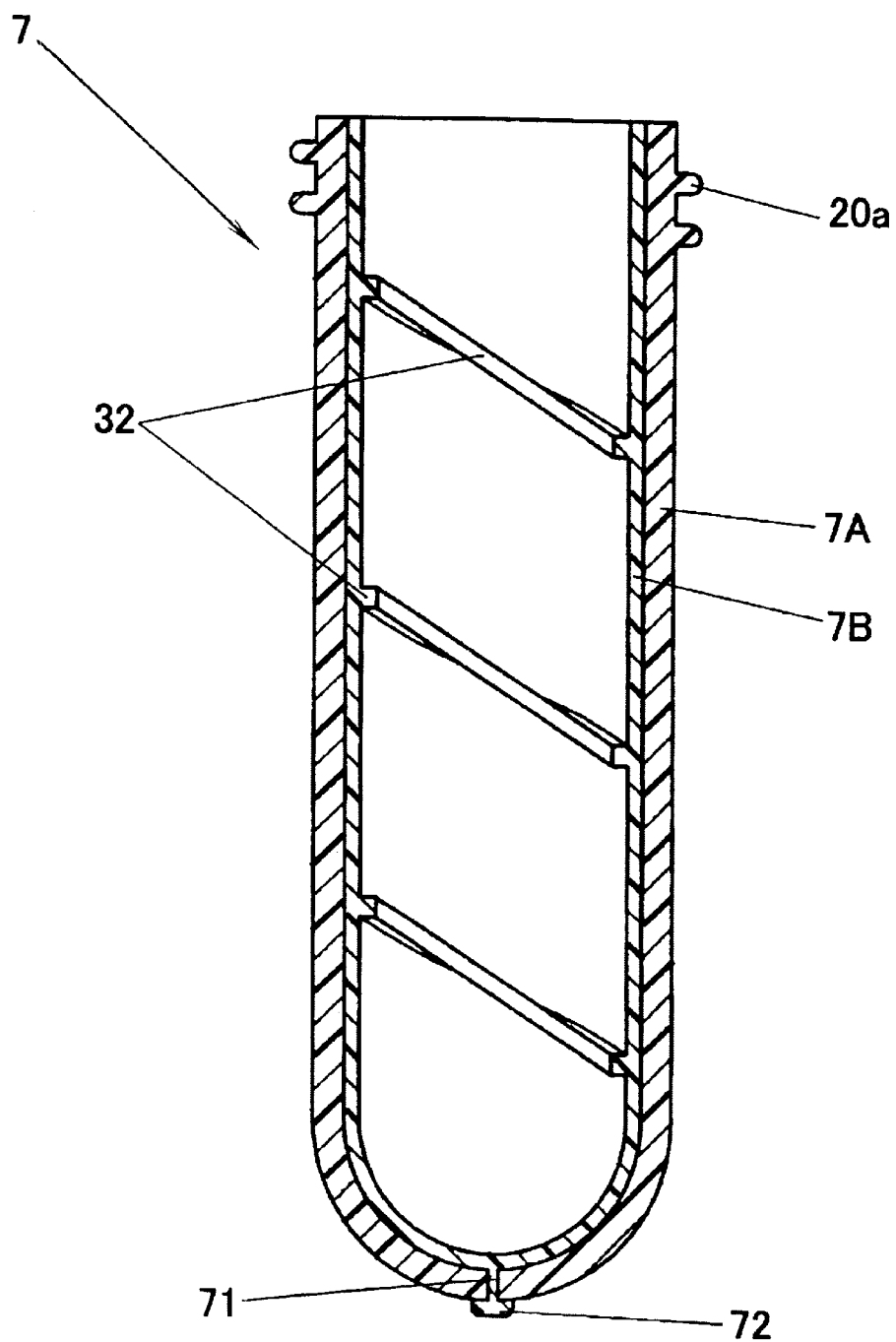
FIG. 21 is a vertical cross section of the parison shown in FIG. 20.

In another example shown in FIGS. 20 and 21, a helical rib-shaped thickened portion 31 is formed on and integral with the body of inner layer 7B. This layer of a finished bottle obtained by blow molding the parison 7 will shrink itself uniformly, lest any intermediate transverse zone perpendicular to its longitudinal axis should be depressed completely and pre-ceding remainders to thereby choke the bottle According to the present invention, a through-hole is formed in a bottom of a preform, at the step of preparing same to provide an outer layer in the finished product. The number of manufacture steps is now reduced, as compared with the case of using a drill to form the hole, thus lowering manufacture cost of laminated containers.

In the invention, the inner preform having a lower thermal deformation temperature than the molding temperature of the outer preform is molded therein after having molded same. One of drawbacks inherent in the prior art molding the preform of an inner layer at first resides in that the inner preform is thermally deformed while molding the preform of an outer layer This problem is now resolved to provide qualified preforms each composed of a plurality of layers.

When molding the inner preform inside the outer preform having the through-hole longitudinally formed at the bottom thereof, a resin for the inner layer is caused to flow through and out of the hole. A flange-shaped member is provided herein as a bottom portion of the inner layer constituting the stretched laminated container. Such a flange formed outside the bottom of the outer layer will prevent the inner layer from curling up during use of the product.

Also in the present invention, the inner layer may be formed integral with a plurality of thickened portions extending up and down at angular intervals, or thick portions extending in a helical direction. These structures may restrict shrinkage of the inner layer in such a way that the upper end region thereof would otherwise be depressed at first to choke the bottle. The content of the container provided herein and free from such a problem will now be exhausted thoroughly and smoothly.

Further, since ventilation holes are formed at the step of molding the outer preform, an operation for forming these holes only in the outer layer is readily and surely conducted without injuring the inner layer of the laminated delaminatable container. Thus, an improvement is achieved not only in respect of the yield of products but also as to the manufacture efficiency in production of such delaminatable laminated containers each having ventilation holes.

After having molded the delaminatable inner preform on the inner surface of the outer preform, the stretching for orientation thereof is conducted for the portion thereof located below the ventilation holes. Thus, the inner layer portions corresponding to regions where the ventilation holes have been formed in the outer layer will keep its original or 'un-stretched' wall even after the stretching of these layers. Such a relatively thick portion may function as a valve cooperating with each corresponding ventilation hole, consequently rendering simpler the manufacture process and lowering manufacture cost as compared with the case of molding extra or discrete valves.

When molding the inner preform, the inner end of the pin employed herein is located to be substantially in flush with the inner surface of the outer preform. Thus, the resin forming the inner preform can be prevented from flowing into portions intended to form the ventilation holes in the outer preform.

What is claimed is:

1. A method of making a laminated bottle having an outer layer and an inner layer laminated on an inner surface of the outer layer so as to be capable of delaminating from the surface, the method comprising the steps of:

injection molding an outer preform for the outer layer by injecting a molten first resin, and forming a through-hole in the outer preform being injection molded at a portion thereof facing an injection gate for injecting the second resin, wherein the through-hole is formed by a first pin, the pin projecting toward a further injection gate for injecting the first resin through it after injecting of the first resin has been finished so that an end portion of the pin strikes the further gate;

then injection molding inside the outer preform an inner preform for the inner layer by injecting a molten second resin through the gate and also the though-hole to flow along an inner surface of the outer preform so that the preforms comprise a parison; and and finally blow molding the laminated bottle by blowing the parison, wherein the second resin has a melting point lower than that of the first resin.

2. A method of making a laminated bottle having an outer layer and an inner layer laminated on an inner surface of the outer layer so as to be capable of delaminating from the surface, the method comprising the steps of:

injection molding an outer preform for the outer layer by injecting a molten first resin, and forming a through-hole in the outer preform being injection molded at a portion thereof facing an injection sate for injecting the second resin;

then injection molding inside the outer preform an inner preform for the inner layer by injecting a molten second resin through the gate and also the though-hole to flow along an inner surface of the outer preform so that the preforms comprise a parison;

and finally blow molding the laminated bottle by blowing the parison, wherein
the second resin has a melting point lower than that of the first resin,
the inner preform is injection molded so that a bulge of the second resin is formed, the bulge projecting outwardly through the through-hole from the outer preform,
and a stretching rod used to stretch the parison longitudinally depresses and collapses the bulge at said blow molding.

3. A method of making a laminated bottle having an outer layer and an inner layer laminated on an inner surface of the outer layer so as to be capable of delaminating from the surface, the method applied to make the laminated bottle having at least one ventilation hole to allow ambient air to flow in between the outer and inner layers, and comprising the steps of:

injection molding an outer preform for the outer layer by injecting a molten first resin;

then injection molding inside the outer preform an inner preform for the inner layer by injecting a molten second resin so that the preforms comprise a parison;

and finally blow molding the laminated bottle by blowing the parison, wherein
the second resin has a melting point lower than that of the first resin,
the ventilation hole is formed at the step of injection molding of the outer preform, and
when the inner preform is subsequently injection molded, a second pin has been inserted from outside and through the outer preform in such a manner that an end portion of the second pin is held substantially in flush with the inner surface of the outer preform.

4. The method as defined in claim 3, wherein a cavity segment and a first core segment for molding the outer preform are used for injection molding the outer preform,
the method further comprising the additional step of replacing the first core segment with a second core segment for molding the inner preform, without removing the outer preform out of the cavity segment, with the additional step being interposed between the steps of injection molding the outer and inner preforms,
wherein the cavity segment and the second segment are used for injection molding the inner preform,
forming the ventilation hole comprises striking the second pin against the first core segment before the resin of the outer preform cures at the step of injection molding the outer preform,
and the ventilation hole remains closed with the second pin during injection molding the inner layer.

5. The method as defined in claim 4, wherein the second pin is capable of shifting between its projected position where the pin strikes the first core segment clamped to the cavity segment and its retracted position where the pin is embedded in the cavity segment.

6. The method as defined in claim 4, wherein the outer preform is held by a lip mold all through the first, second and third steps,
and the second pin is capable of shifting between its projected position where the pin strikes the first core segment clamped to the cavity segment and its retracted position where the pin is embedded in the lip mold, and the pin at the projected position clogs the ventilation hole but the pin at the retracted position leaves the hole opened.

7. The method as defined in claim 3, wherein a first injection mold is used for injection molding the outer preform and a second injection mold is used for injection molding the inner preform,
and the method comprises the steps, between the steps of respectively injection molding the outer and inner preforms, of releasing the outer preform from the first mold, loading the released outer preform into the second mold, inserting the pin into the ventilation hole that has been formed in the outer preform,
and wherein the pin remains left is the ventilation hole during injection molding of the inner layer.

8. The method as defined in claim 3, wherein the parison is blow molded such that stretching for orientation of the preforms is conducted for the portion thereof located below the ventilation hole.

* * * * *